US011336833B1

(12) United States Patent
Cutler et al.

(10) Patent No.: US 11,336,833 B1
(45) Date of Patent: May 17, 2022

(54) REMOTE USER FIELD OF VIEW-BASED CAMERA ORIENTING

(71) Applicant: Microsoft Technology Licensing, LLC, Redmond, WA (US)

(72) Inventors: Benjamin Franklin Cutler, Seattle, WA (US); Wen-Yu Chang, Bellevue, WA (US); Spencer G Fowers, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/187,133

(22) Filed: Feb. 26, 2021

(51) Int. Cl.
| H04N 5/262 | (2006.01) |
| H04N 5/232 | (2006.01) |
| G06T 7/70 | (2017.01) |
| H04N 7/14 | (2006.01) |
| H04N 7/15 | (2006.01) |

(52) U.S. Cl.
CPC ........... *H04N 5/23299* (2018.08); *G06T 7/70* (2017.01); *H04N 5/23222* (2013.01); *H04N 5/23296* (2013.01); *H04N 5/2628* (2013.01); *H04N 7/144* (2013.01); *H04N 7/15* (2013.01); *G06T 2207/30201* (2013.01)

(58) Field of Classification Search
CPC ........... H04N 5/23299; H04N 5/23222; H04N 5/23296; H04N 5/2628; H04N 7/144; H04N 7/15; G06T 7/70; G06T 2207/30201
USPC .................................................... 348/240.99
See application file for complete search history.

(56) References Cited

U.S. PATENT DOCUMENTS

| 5,159,445 | A | * | 10/1992 | Gitlin | ..................... | H04N 7/144 348/14.01 |
| 5,194,955 | A | * | 3/1993 | Yoneta | ................... | H04N 7/144 348/14.01 |
| 6,042,235 | A | * | 3/2000 | Machtig | ................. | G02B 30/56 353/28 |

(Continued)

FOREIGN PATENT DOCUMENTS

WO 2018039071 A1 3/2018

OTHER PUBLICATIONS

"Final Office Action Issued In U.S. Appl. No. 15/955,669", dated Apr. 26, 2019, 16 Pages.

(Continued)

*Primary Examiner* — Usman A Khan
(74) *Attorney, Agent, or Firm* — NovoTechIP International PLLC

(57) ABSTRACT

In a system including a processor and a computer-readable medium in communication with the processor, the computer-readable medium includes executable instructions that, when executed by the processor, cause the processor to control the system to perform receiving, from a remote system via a communication network, a first remote field of view (FOV) of a remote subject; causing, based on the received first remote FOV, a camera orienting unit to orient a camera in a first orientation, wherein the camera oriented in the first orientation has a first local FOV corresponding to the first remote FOV received from the remote system; upon orienting the camera in the first orientation, causing an image capturing unit to capture a first local image through a display; and transmitting, to the remote system via the communication network, the captured first local image.

18 Claims, 18 Drawing Sheets

(56) References Cited

U.S. PATENT DOCUMENTS

| | | | | |
|---|---|---|---|---|
| 6,259,470 | B1* | 7/2001 | Koizumi | G06T 15/10 |
| | | | | 348/14.01 |
| 7,139,767 | B1 | 11/2006 | Taylor et al. | |
| 7,714,923 | B2* | 5/2010 | Cok | H04N 7/144 |
| | | | | 348/333.01 |
| 7,916,167 | B2* | 3/2011 | Miyagawa | H04N 7/144 |
| | | | | 348/14.16 |
| 8,022,977 | B2* | 9/2011 | Kanade | H04N 7/144 |
| | | | | 348/14.07 |
| 8,390,671 | B2* | 3/2013 | Kanade | H04N 5/2254 |
| | | | | 348/14.16 |
| 8,432,432 | B2 | 4/2013 | Cutler et al. | |
| 9,204,089 | B2* | 12/2015 | Nagano | H04N 7/144 |
| 9,681,096 | B1* | 6/2017 | Motta | H04N 5/23219 |
| 9,928,655 | B1 | 3/2018 | Alston | |
| 10,122,969 | B1 | 11/2018 | Lim et al. | |
| 10,554,928 | B2 | 2/2020 | Cutler | |
| 2004/0189794 | A1* | 9/2004 | Rambo | H04N 7/144 |
| | | | | 348/14.16 |
| 2004/0257473 | A1* | 12/2004 | Miyagawa | H04N 7/144 |
| | | | | 348/571 |
| 2007/0002130 | A1* | 1/2007 | Hartkop | H04N 7/141 |
| | | | | 348/14.16 |
| 2008/0227501 | A1* | 9/2008 | Joo | G06F 1/1616 |
| | | | | 455/566 |
| 2009/0009628 | A1* | 1/2009 | Janicek | H04N 7/144 |
| | | | | 348/231.99 |
| 2009/0102763 | A1* | 4/2009 | Border | H04N 7/144 |
| | | | | 345/87 |
| 2010/0329358 | A1 | 12/2010 | Zhang et al. | |
| 2011/0199497 | A1 | 8/2011 | Motta et al. | |
| 2011/0292051 | A1 | 12/2011 | Nelson et al. | |
| 2013/0182062 | A1* | 7/2013 | Son | H04N 7/14 |
| | | | | 348/14.07 |
| 2016/0099429 | A1 | 4/2016 | Bruder et al. | |
| 2016/0105640 | A1 | 4/2016 | Travis et al. | |
| 2016/0150196 | A1* | 5/2016 | Horvath | H04N 5/232945 |
| | | | | 348/211.4 |
| 2016/0203607 | A1 | 7/2016 | Müller et al. | |
| 2016/0366365 | A1 | 12/2016 | Iyer et al. | |
| 2017/0124942 | A1* | 5/2017 | Evans | G06F 1/1686 |
| 2018/0020201 | A1* | 1/2018 | Motta | H04N 7/144 |
| 2018/0332317 | A1 | 11/2018 | Song et al. | |
| 2019/0158713 | A1* | 5/2019 | McMillan | H01L 27/3234 |
| 2019/0320135 | A1* | 10/2019 | Cutler | H04N 7/147 |
| 2019/0320142 | A1 | 10/2019 | Cutler | |
| 2019/0373216 | A1 | 12/2019 | Cutler et al. | |

OTHER PUBLICATIONS

"Non Final Office Action Issued in U.S. Appl. No. 15/955,669", dated Dec. 3, 2018, 14 Pages.

"Non Final Office Action Issued In U.S. Appl. No. 15/955,672", dated Sep. 11, 2020, 12 Pages.

"Non Final Office Action Issued In U.S. Appl. No. 15/955,672", dated Jan. 8, 2020, 9 pages.

Adhikarla, et al., "Fast and efficient data reduction approach for multi-camera light field display telepresence systems", In Proceedings of 3DTV Conference on Vision Beyond Depth, Oct. 7, 2013, 04 Pages.

Chen, Milton, "Leveraging the Asymmetric Sensitivity of Eye Contact for Videoconferencing", In Proceedings of the SIGCHI conference on Human factors in computing systems, Apr. 20, 2002, 8 Pages.

Graziosi, et al., "Introduction to tiled full parallax light field display and requirements for FTV discussion", In Publication of Motion Picture Expert Group, Feb. 23, 2016, 15 Pages.

Lin, et al., "A Geometric Analysis of Light Field Rendering", In International Journal of Computer Vision, vol. 58, No. 2, Jul. 1, 2004, pp. 121-138.

"International Search Report and Written Opinion Issued in PCT Application No. PCT/US19/025270", dated Jun. 28, 2019, 13 Pages.

"International Search Report and Written Opinion Issued in PCT Application No. PCT/US19/025271", dated Jun. 28, 2019, 13 Pages.

Stokes, Rembert R., "Human Factors and Appearance Design Considerations of the Mod II Picturephone Station Set", In Journal of IEEE Transactions on Communication Technology, vol. 17, Issue 2, Apr. 1969, pp. 318-323.

Tan, et al., "ConnectBoard: Enabling Genuine Eye Contact and Accurate Gaze in Remote Collaboration", In Journal of IEEE Transactions on Multimedia, vol. 13, No. 3, Jun. 2011, pp. 466-473.

Vertegaal, et al., "Explaining Effects of Eye Gaze on Mediated Group Conversations: Amount or Synchronization?", In Proceedings of the ACM Conference on Computer Supported Cooperative Work, Nov. 16, 2002, pp. 41-48.

Yang, et al., "Eye Gaze Correction with Stereovision for Video Tele-Conferencing", In Proceedings of 7th European Conference on Computer Vision, May 28, 2002, 16 Pages.

Yang, et al., "Interactive 3D Teleconferencing with User-adaptive Views", In Proceedings of the ACM SIGMM Workshop on Effective Telepresence, Oct. 15, 2004, pp. 50-51.

* cited by examiner

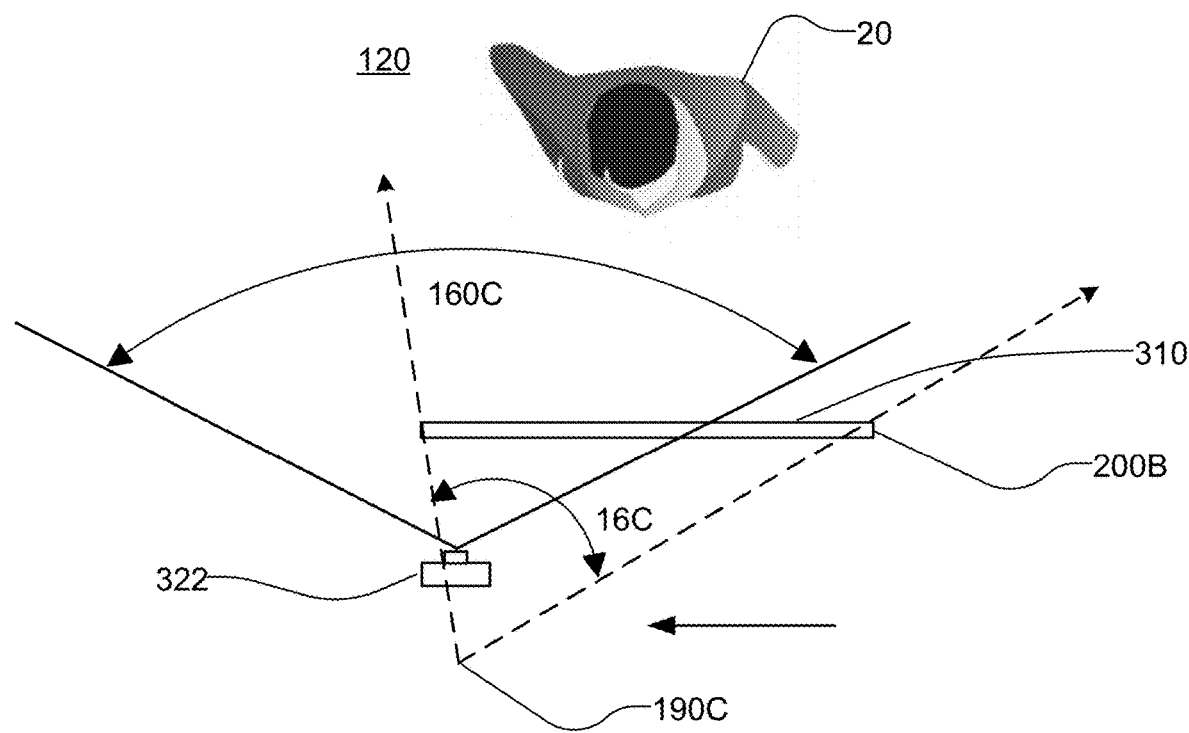
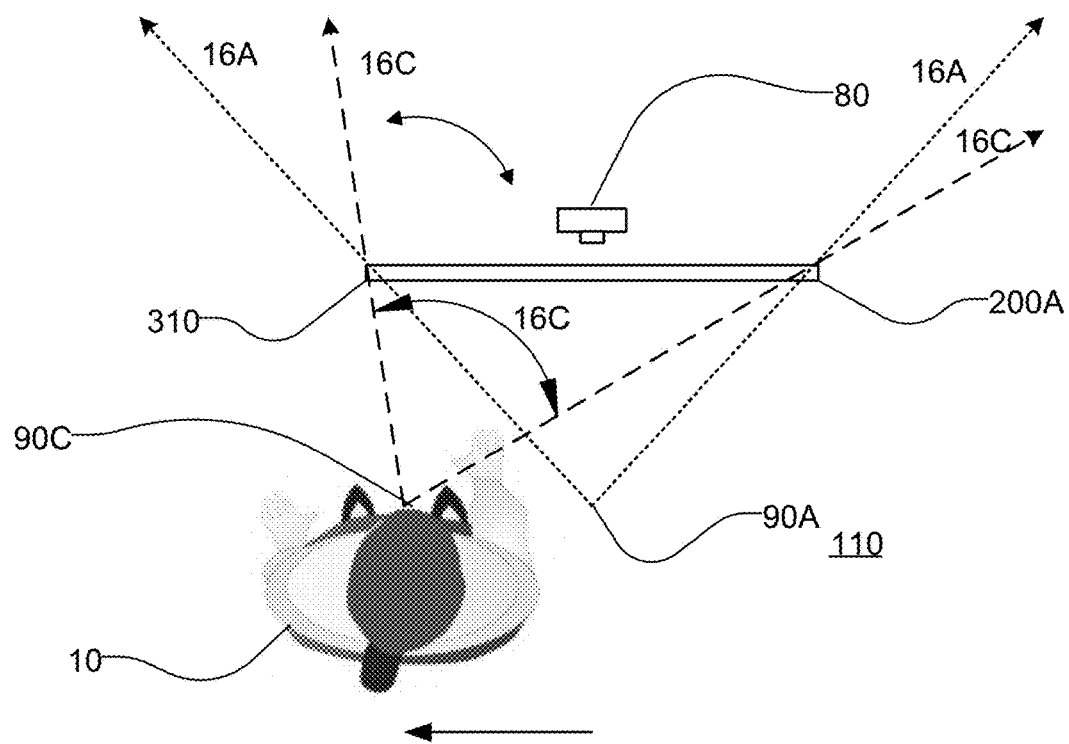
FIG. 8C

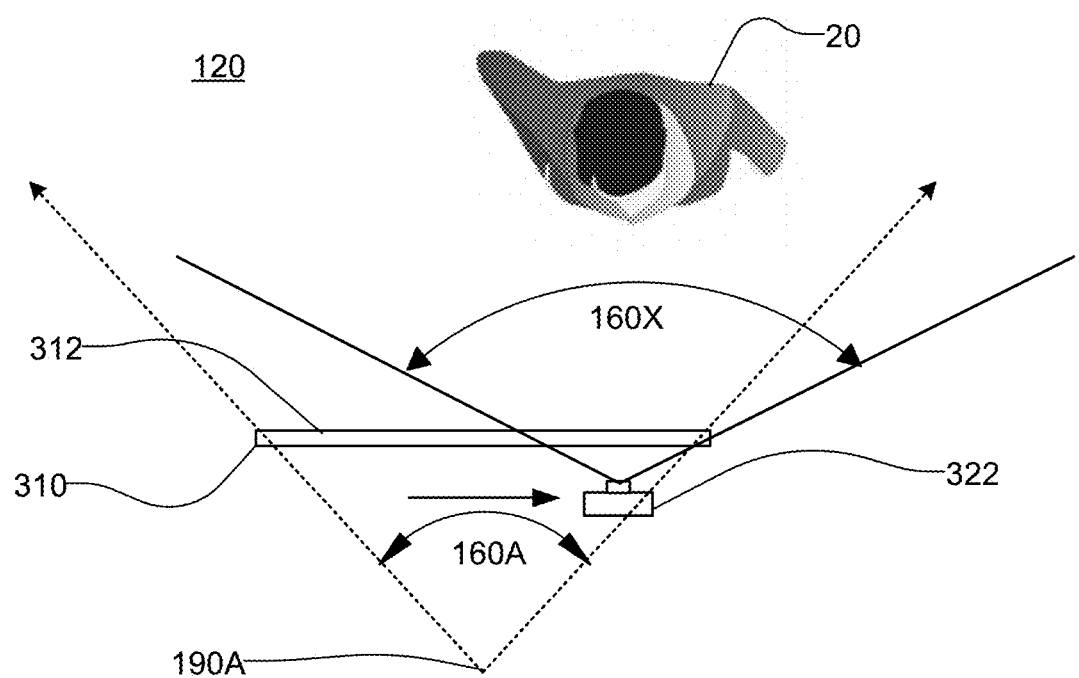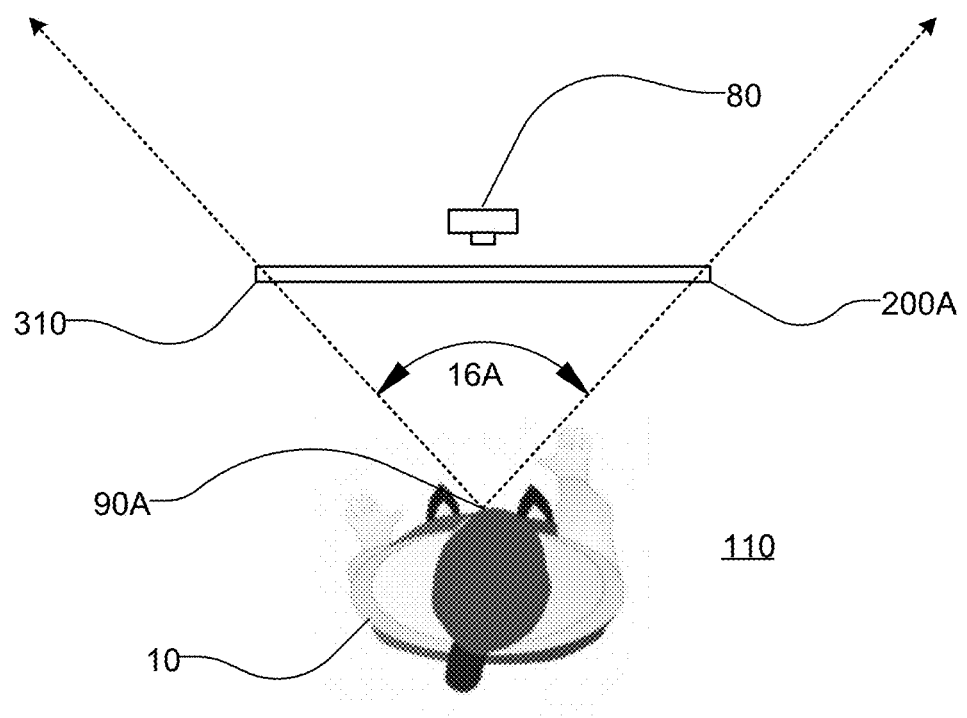
FIG. 10

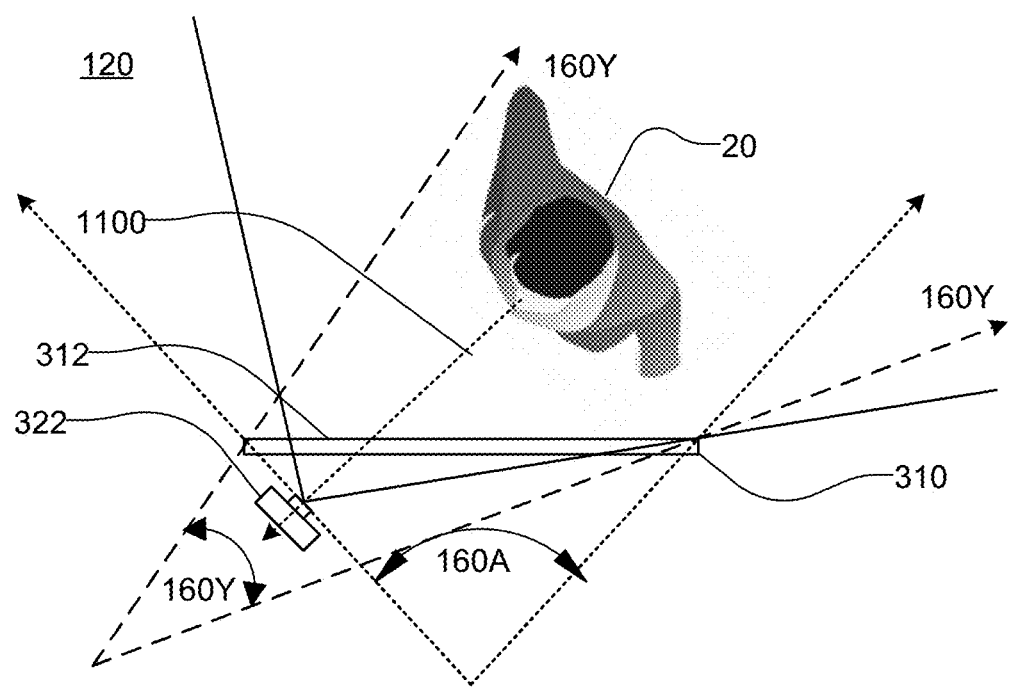
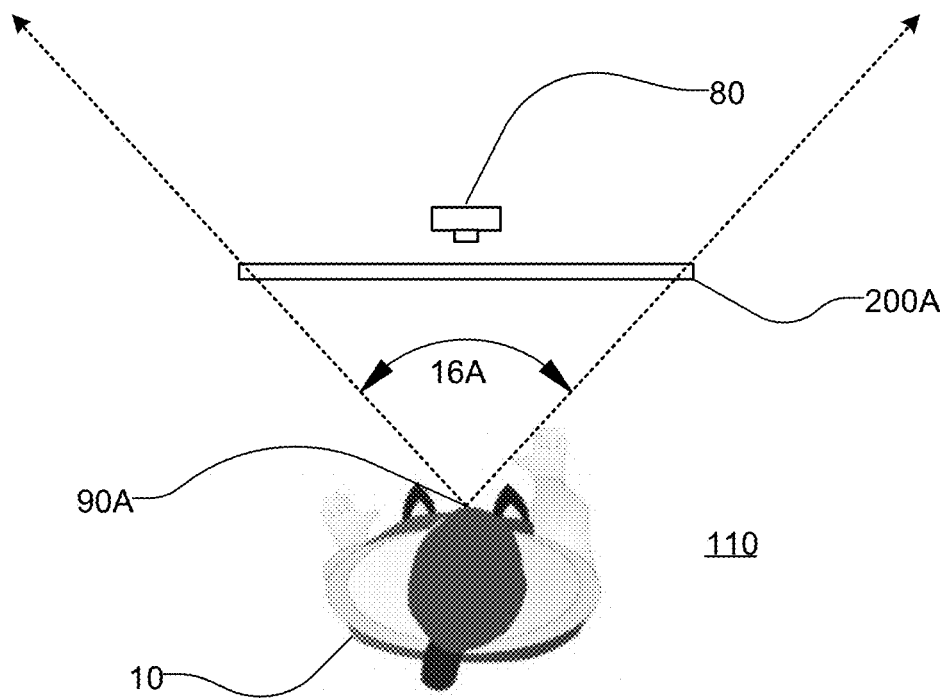
FIG. 11

REMOTE USER FIELD OF VIEW-BASED CAMERA ORIENTING

BACKGROUND

Video conferencing technologies have become increasingly commonplace. Such technologies are now being used worldwide for a wide variety of both personal and business communications. For example, during a teleconference or other video conferencing session, individuals may "interact" and engage in face-to-face conversations through images and sound captured by digital cameras and transmitted to participants. In an attempt to provide more engaging video conferencing experiences, a set of technologies called "telepresence" have been introduced, which aim to allow participants at different geographical locations to feel as if they were present at the same location. The telepresence has provided certain improvements over conventional video conferencing schemes, including immersion experiences to videoconferencing participants located in different geographical locations. By providing sufficient immersion experiences, the participants may feel the same level of trust and empathy as being face-to-face to each other at the same location. However, in order to provide sufficient immersion experiences, it is necessary to simultaneously capture a number of images of a local scene from a number of perspectives and transmit the captured images to a remote site. Hence, a large number of high speed and high performance cameras (e.g., light field cameras) may need to be operated simultaneously, which results in generating a large amount of data that needs to be encoded and transmitted to a remote site via a communication network. As such, there still remain significant areas for more efficient implementations for telepresence techniques that provide sufficient immersion experiences.

SUMMARY

In an implementation, a system for capturing a local image for transmission to a remote system, includes a display having a front surface facing a local subject and a rear surface facing opposite to the front surface; an image capturing unit including (i) a camera positioned on the rear surface of the display and configured to capture a local image through the display, and (ii) a camera orienting unit configured to orient the camera; a processor; and a computer-readable medium in communication with the processor. The computer-readable medium includes executable instructions that, when executed by the processor, cause the processor to control the system to perform functions of receiving, from a remote system via a communication network, a first remote field of view (FOV) of a remote subject; causing, based on the received first remote FOV, the camera orienting unit to orient the camera in a first orientation, wherein the camera oriented in the first orientation has a first local FOV corresponding to the first remote FOV received from the remote system; upon orienting the camera in the first orientation, causing the image capturing unit to capture a first local image through the display; and transmitting, to the remote system via the communication network, the captured first local image.

In another implementation, a non-transitory computer-readable medium stores executable instructions that, when executed by a processor, cause the processor to control a system to perform receiving, from a remote system via a communication network, a first remote field of view (FOV) of a remote subject; orienting, based on the received first remote FOV, a camera in a first orientation, the camera positioned on a rear surface of a display, wherein the camera oriented in the first orientation has a first local FOV corresponding to the first remote FOV received from the remote system; upon orienting the camera in the first orientation, causing the camera to capture a local image through the display; and transmitting, to the remote system via the communication network, the captured first local image.

In another implementation, a method of operating a system for capturing a local image for transmission to a remote system, the system including (i) a display having a front surface facing a local subject and a rear surface facing opposite to the front surface, and (ii) a camera positioned on the rear surface of the display and configured to capture a local image through the display, includes receiving, from a remote system via a communication network, a first remote field of view (FOV) of a remote subject; orienting, based on the received first remote FOV, the camera in a first orientation, wherein the camera oriented in the first orientation has a first local FOV corresponding to the first remote FOV received from the remote system; upon orienting the camera in the first orientation, causing the camera to capture a first local image through the display; and transmitting, to the remote system via the communication network, the captured first local image.

In another implementation, a system for capturing a local image for transmission to a remote system includes a processor and a computer-readable medium in communication with the processor. The computer-readable medium includes executable instructions that, when executed by the processor, cause the processor to control the system to perform functions of receiving, from a remote system via a communication network, a remote field of view (FOV) of a remote subject; orienting, based on the received remote FOV, the camera in a first orientation, wherein the camera oriented in the first orientation has a local FOV corresponding to the remote FOV received from the remote system; detecting at least one of a position, head-facing direction and eye-gazing direction of the local subject with respect to the local FOV; determining, based on at least one of the detected position, head-facing direction and eye-gazing direction of the local subject with respect to the local FOV, that the local subject is not positioned at a center of the local FOV or the local subject is not gazing at the center of the local FOV; orienting the camera in a second orientation that offsets at least one of a distance between the center of the first local FOV and the detected position of the local subject and an angular difference between the center of the first local FOV and the detected head-facing direction or eye-gazing direction of the local subject; causing the camera to capture a local image with the second orientation; and transmitting, to the remote system via the communication network, the captured first local image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 8A, 8B, 8C, 8D and 8E illustrate orienting, based on various remote field of views (FOVs), the camera to have various local FOVs corresponding to the remote FOVs, respectively.

FIG. 10 illustrates an orientation of the camera being offset based on a position of a local subject.

FIG. 11 illustrates an orientation of the camera being offset based on a head-facing direction or eye-gazing direction of the local subject.

DETAILED DESCRIPTION

Figure 1:
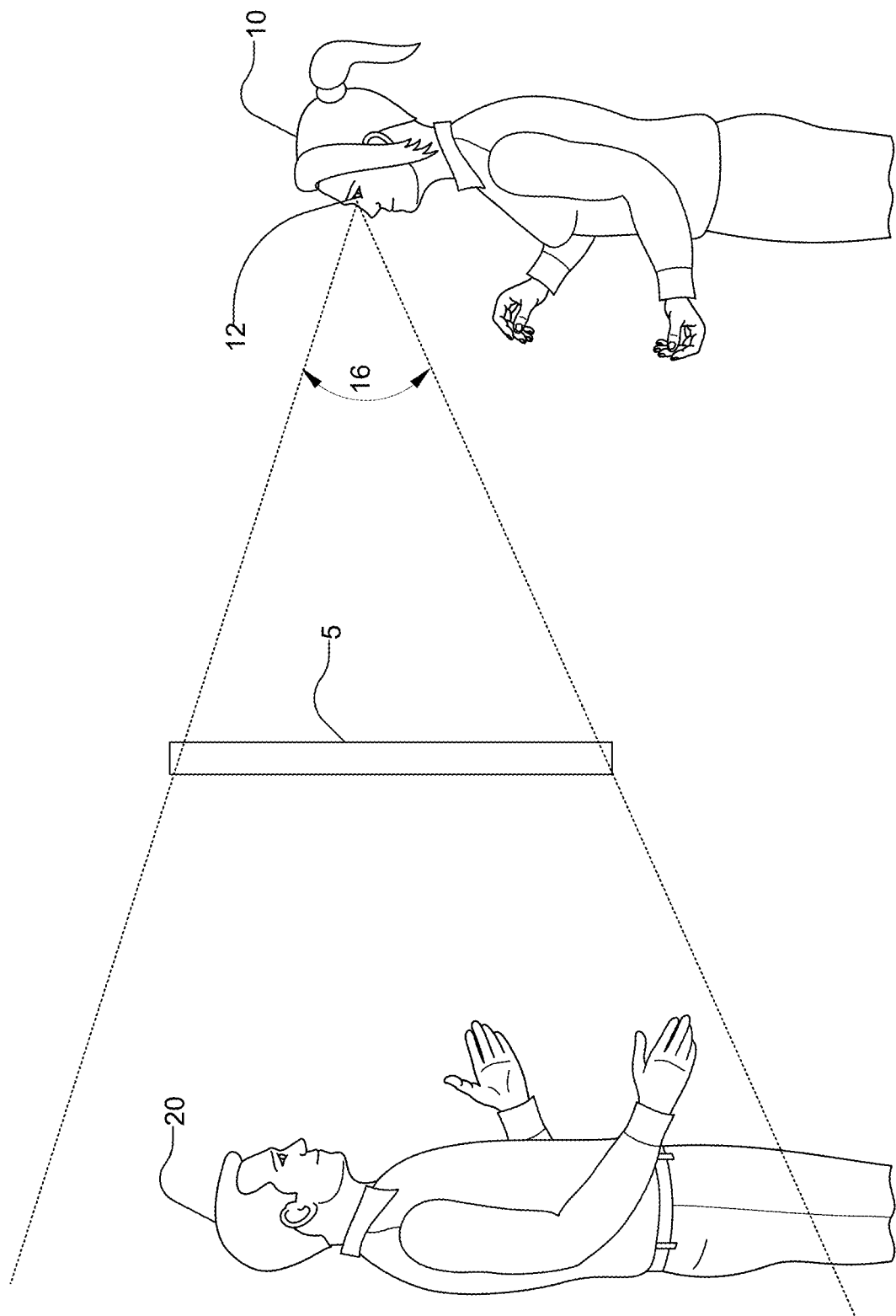
FIG. 1 illustrates two persons standing at the same site and looking at each other through a physical window positioned between the two persons.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This description is directed to capturing local images of a local site with a camera oriented according to a remote subject's field of view (FOV). Upon receiving the remote subject's FOV, the camera may be oriented by rotating (e.g., panning, tilting, diagonally shifting, etc.) the camera, controlling zooming of the camera and/or moving the camera on a two-dimensional (2D) plane or in a three-dimensional (3D) space to have a local FOV corresponding to the remote subject's FOV. Then, a local image is captured with the camera and transmitted to the remote system. When the remote subject moves and the remote subject's FOV is changed, an updated remote FOV is received from the remote system. The camera is then re-oriented to have an updated FOV which corresponds to the updated remote subject's FOV, and a new local image is captured and transmitted to the remote system. Based on the local images, the remote system may display a view of the local site that changes in response to the movements of the remote subject, which may provide immersive videoconferencing/telepresence experience to the remote subject. By orienting the camera to have a FOV that corresponds to the remote subject's FOV, only one camera (or a few more) may be needed and only the images captured by one camera may need to be processed and encoded for transmission in order to provide images of the local site that is actively responsive to the remote subject's movement. Hence, this disclosure provides technical solutions to the technical problems with other image capturing approaches that require a large number of cameras that simultaneously capture the same scene or object from different perspectives and a high processing power to filter all the images captured by the cameras and encode filtered images for transmission. Also, the amount of data for transmitting the captured images of the local site may be significantly reduced, thereby eliminating a need for a higher transfer rate network connection, which is not readily available or too expense for most consumers. Also, it is not necessary for users to use or wear any additional pieces of equipment, such as, an augmented reality (AR) or virtual reality (VR) set, or the like, which could alter the appearance and impression of the users.

This disclosure is not limited to physically rotating, moving or zooming the camera as similar or same results may be achieved by processing a captured image to emulate rotating, moving or zooming of the camera. Thus, a physical approach (i.e., physically rotating, moving and zooming a camera and a software approach (i.e., processing a captured image to emulate rotating, moving and zooming a camera may be used in an isolated or complimentary manner. In addition, an image captured by using the physical or software approach, or both, may be further processed to, for example, normalize the captured image, remove unnecessarily image portions, reduce the amount of data, etc. For example, due to inherent lens characteristics, an image captured by the camera may be distorted (e.g., fisheye lens effect). In order to reduce or eliminate such distortion, the captured image may be modified or warped to stretch or compress different portions of the captured image in an attempt to compensate the distortion, which is commonly known as warping. Hence, the physical and software approaches and image normalization may be discretionally used in an isolated or complimentary manner.

With this overview, attention is now turned to the figures to described various implementations of the presenting teachings. FIG. 1 illustrates Alice 10 and Bob 20 standing at the same site and looking at each other through a physical window 5 positioned between them. When a camera (not shown) is used to capture a scene viewed by Alice 10 through the window 5, an ideal location for capturing the scene including Bob 20 would be Alice's eye location 12. Alice 10 does not have a full view of Bob 20 because Alice's view of Bob 20 is limited by the size of the window 5, which blocks Bob's low leg portion. Such Alice's view of Bob 20 and the surrounding, which is limited by the window 5, is referred to as Alice's FOV 16. As Alice 10 moves, a view through the window 5 that is seen by Alice 10 changes. For example, when Alice 10 moves towards the window 5, Alice's FOV 16 widens, Alice can see more areas through the window 5, which includes Bob's lower leg portion. Also, as Alice 10 gets closer to Bob 20, Bob 20 occupies a larger portion of Alice's FOV 16, making Bob 20 look bigger.

When such natural view changes are captured and displayed on a screen, Alice 10 may perceive Bob's images as more realistic and may feel the same or similar level of trust and empathy as being face-to-face at the same location.

Figure 2:
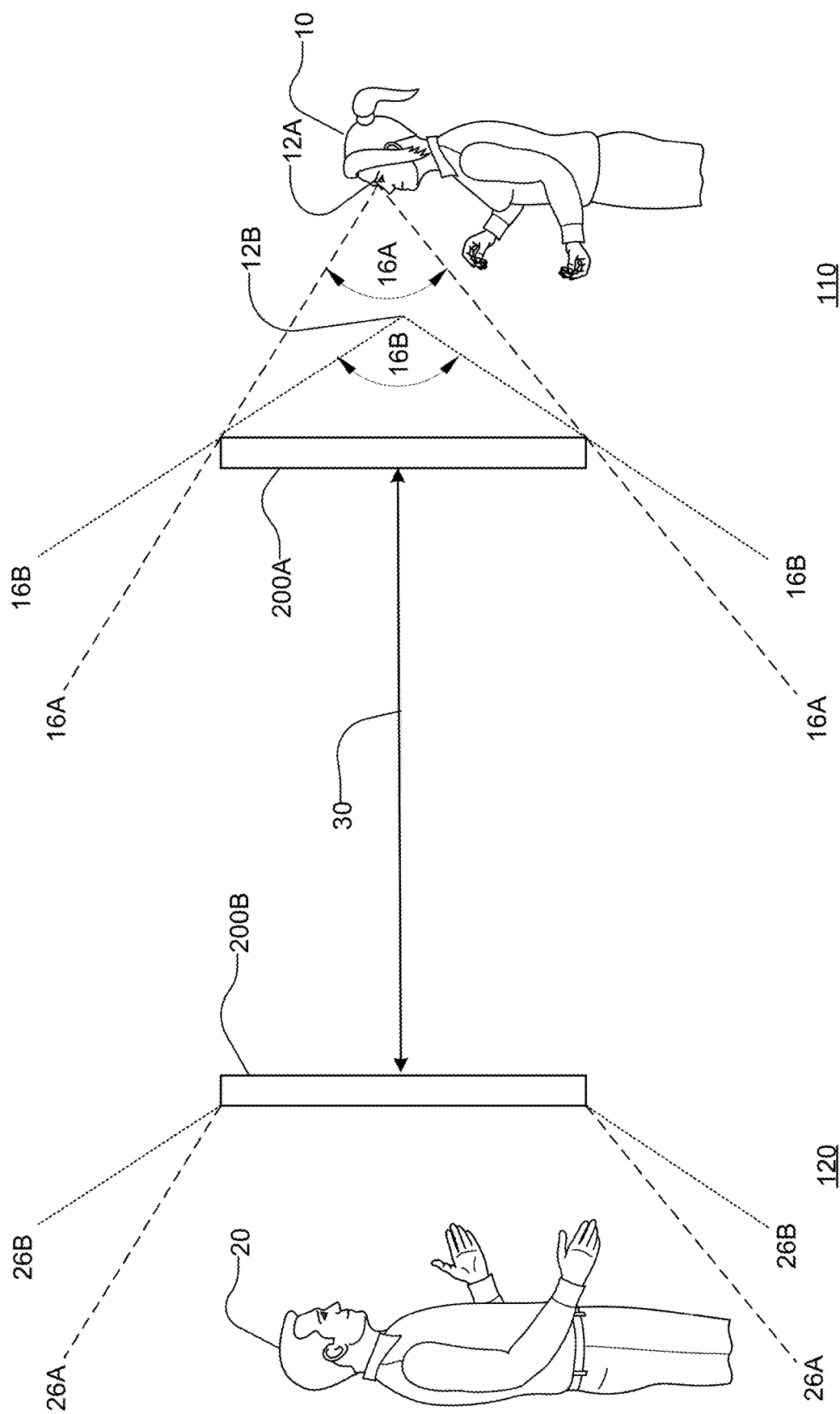
FIG. 2 illustrates two persons standing at two different sites, respectively, and each person looking at a telepresence device displaying an image of the other person.

FIG. 2 illustrates Alice 10 and Bob 20 located at first and second sites 110 and 120, respectively, that are geographically remote from each other. Alice 10 and Bob 20 are using video conferencing or telepresence devices 200A and 200B (collectively referred to as devices 200), respectively, to have a video conference with each other. The devices 200 may be communicatively linked via a network 30, which may be a wired network, a wireless network, or a combination thereof. As will be described in more detail in later examples, Alice's device 200A may transmit Alice's FOV 16A to Bob's device 200B via the network 30. Alice's FOV 16A may be determined based on Alice's eye location 12A. In response to receiving Alice's FOV 16A, Bob's device 200B may capture an image of the second site 120 with a FOV 26A which corresponds to Alice's FOV 16A, and transmit the captured image to Alice device 200A. Then, Alice's device 200A may display the image of the second site 120 that is captured based on Alice's FOV 16A. When Alice 10 moves, Alice's device 200A may determine Alice's new FOV 16B, which may be based on Alice's new eye location 12B, and transmit the new FOV 16B to Bob's device 200B. For example, Alice 10 may move closer to the device 200A, which may widen her FOV. Upon receiving the new FOV 16B, Bob's device 200B may capture a new image of the second site 120 with a new FOV 26B which corresponds to Alice's new FOV 16B. For example, Bob's device 200B may capture the second site 120 with the FOV 26B that is wider than the previous FOV 26A, which reflects the changes of Alice's FOV from the narrower FOV 16A and the wider FOV 16B. The captured image of the second site 120 is then transmitted to Alice's device 200A.

In an implementation, Alice's device 200A may continuously determine and transmit Alice's FOV to Bob's device 200B by, for example, continuously tracking the position of Alice with respect to Alice's device 200A. For example, Alice's device 200A may include a camera that detects positions of Alice's head, eye sockets, eye-gazing direction, and/or the like. Based on Alice's head position, the device 200A may determine Alice's coarse position with respect to her device 200A. Then, using a center position of Alice's eye sockets or eyeballs or eye-gazing direction, the device 200A may determine a distance between Alice and her device 200A, Alice's eye gazing direction and angle with respect to the device 200A. Alice's device 200A may also estimate Alice's current or future FOVs based on Alice's past FOVs and transmit the estimate current or future FOVs to Bob's device 200B. Alternatively or additionally, Bob's device 200B may estimate Alice's current or future FOVs based on Alice's past FOVs. Such estimation may be performed by tracking Alice's eye locations, which is described in U.S. Pat. No. 10,554,928, issued on Feb. 4, 2020 and titled "TELEPRESENCE DEVICE" and U.S. patent application Ser. No. 15/955,672, filed on Apr. 17, 2018 titled "TELEPRESENCE DEVICES OPERATION METHODS," which are incorporated by references in their entirety.

Figure 3:
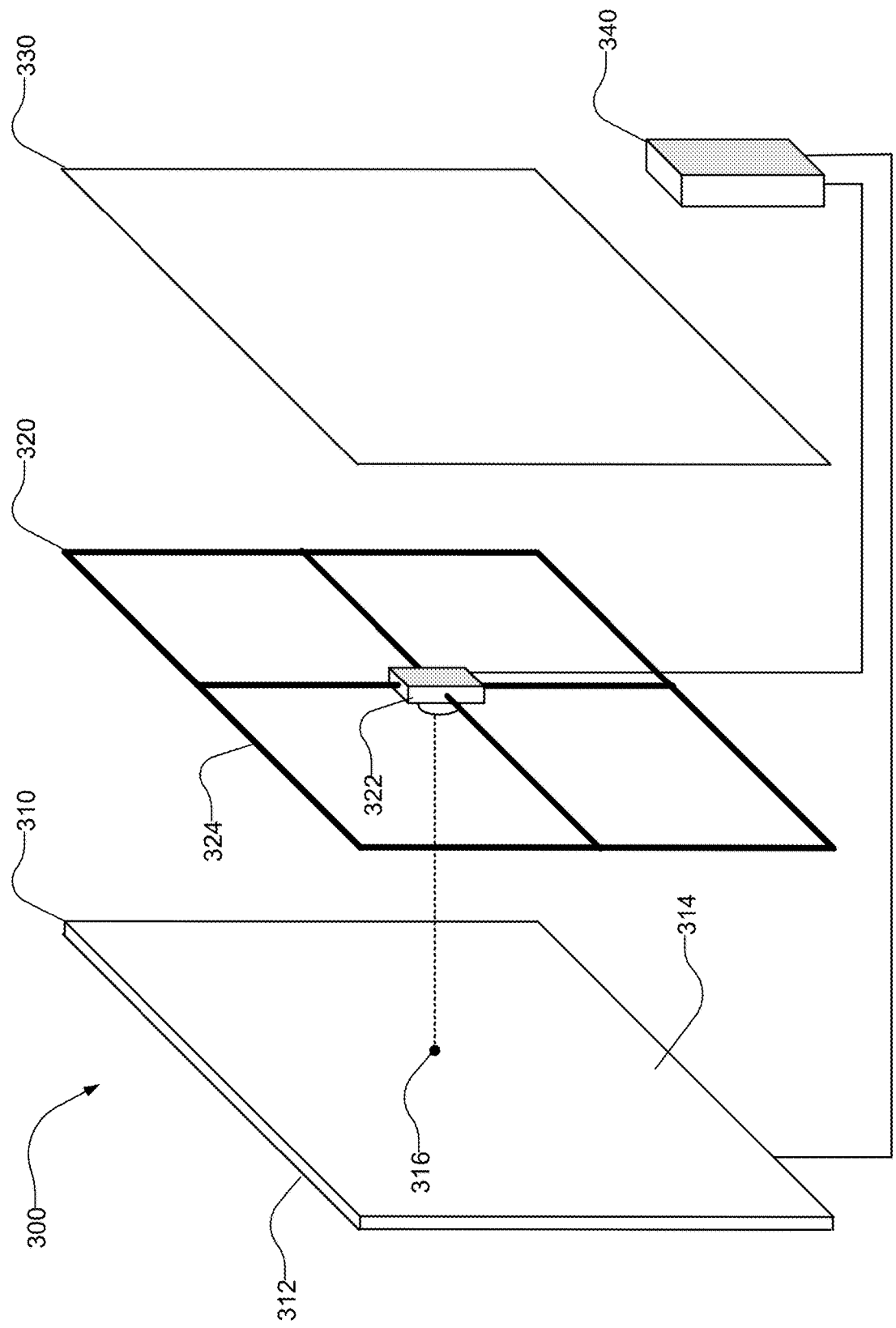
FIG. 3 illustrates an implementation of an image capturing system.

FIG. 3 illustrates an exploded view of an implementation of an image capturing system 300, which may be included in Alice and Bob's telepresence devices 200A and 200B. For example, the system 300 may be included in Bob's device 200B. The image capturing system 300 may include a display 310, image capturing unit 320, a back panel 330 and a control unit 340. The display 310 may be a transparent flat panel display panel, such as organic light-emitting diode (OLED) panel, etc., of which a front surface 312 is facing Bob 20 and a rear surface 314 facing opposite to the front surface 312. The image capturing unit 320 may be sandwiched between the display 310 and back panel 330. The back panel 330 may have dark, opaque or non-reflecting surfaces to avoid reflecting lights and make the image capturing unit 320 invisible or less visible when viewed from the front surface 312 of the display 310. The back panel 330 may be part of an enclosure or construction (not shown) attached to the rear surface 314 of the display 310. Such enclosure or construction may include one or more dark, opaque or non-reflecting surfaces. For example, the enclosure or construction may include the back panel 330 and four side panels that are also dark, opaque or non-reflecting and surrounding the space between the display 310 and back panel 330. The system 300 may be assembled together and contained within a housing (not shown), which may have an appearance similar to a flat panel display device (e.g., television, monitor, tablet, etc.).

The image capturing unit 320 may include a camera 322 positioned on a rear surface 314 of the display 310, and a camera orienting unit 324 configured to orient the camera 322 such that the camera 322 has a FOV corresponding to a FOV received from a remote system, such as Alice's device 200A. The camera 322 may have a wide angle lens and may capture images at a higher resolution (e.g., 4K or 8K resolution) than that of an image transmitted to Alice's device 200A. This may allow to electronically process the captured image data for emulating panning, titling, diagonally shifting, zooming, etc. without lowering the resolution of the transmitted image. This may temporarily or permanently reduce or eliminate a need for physically rotating, moving or zooming the camera 322. The camera orienting unit 324 may control an orientation of the camera 322. For example, the camera 322 may be fixed at a location corresponding to a center 316 of the rear surface 314 of the display 310. The camera orienting unit 324 may be connected to the camera 322 and orient the camera 322 to have a desired FOV by tilting, panning and diagonally shifting the camera 322. The camera 322 may be diagonally shifted at any desired angle by combining tilting and panning. The camera orienting unit 324 may also control zooming of the camera 322.

The control unit 340 may receive Alice's FOV from Alice's device 200A via the network 30. The control unit 340 may then cause, based on Alice's FOV, the camera orienting unit 324 to orient the camera 322 in a particular orientation such that the camera 322 may have a FOV corresponding to Alice's FOV. Upon orienting the camera 322 to have the FOV corresponding to Alice's FOV, the control unit 340 may cause the image capturing unit 320 to capture a local image through the display 310. The control unit 340 may process the image captured by the camera 322 to emulate rotating, moving and zooming of the camera 322. Such physical approach (i.e., physically rotating, moving and zooming of the camera 322) and software approach (i.e., processing the captured image to emulate rotating, moving and zooming of the camera 322) may be discretionally selected in an alternative or complementary manner. For example, when the received FOV requires zooming, the control unit 340 may decide whether such zooming can be done by processing the capture image. If the required zooming is within an operational range of the software approach, the control unit 340 may opt to perform the software approach. This may reduce wear and tear of the mechanical parts constituting the image capturing unit 320 and camera 322. In addition to capturing the image via the physical and/or software approaches, the control unit 340 may perform image normalization of the captured image by, for example, warping (e.g., stretching or compressing different portions of the captured image) to compensate distortions introduced to the captured image. The control unit 340 may then transmit image data including the captured and compensated local image to Alice's device 200A via the network 30.

Figure 4C:
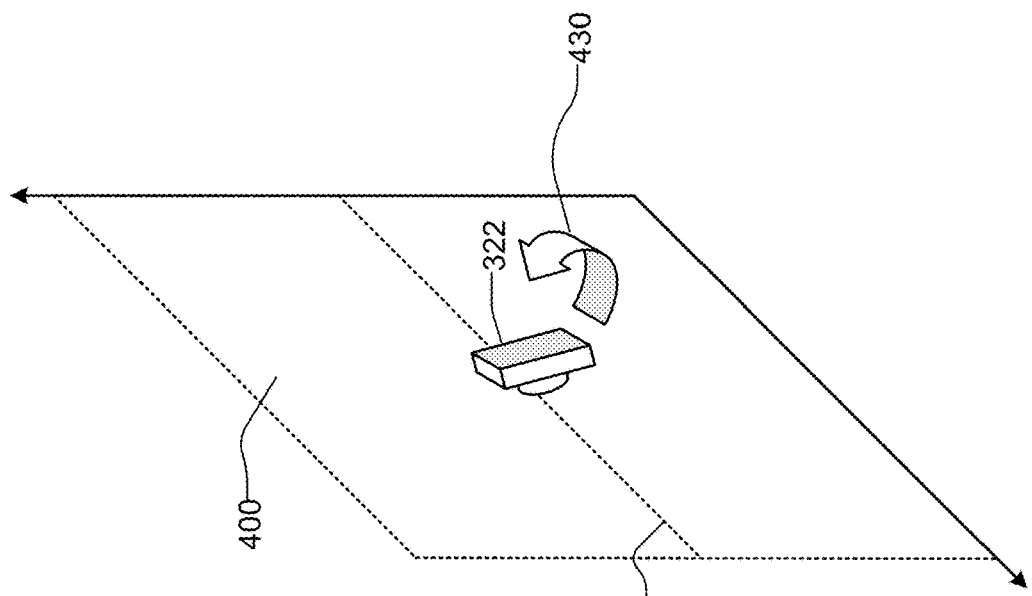
FIGS. 4A, 4B and 4C illustrate a camera of the image capturing system shown in FIG. 3 being tilted at various angles.
Figure 4B:
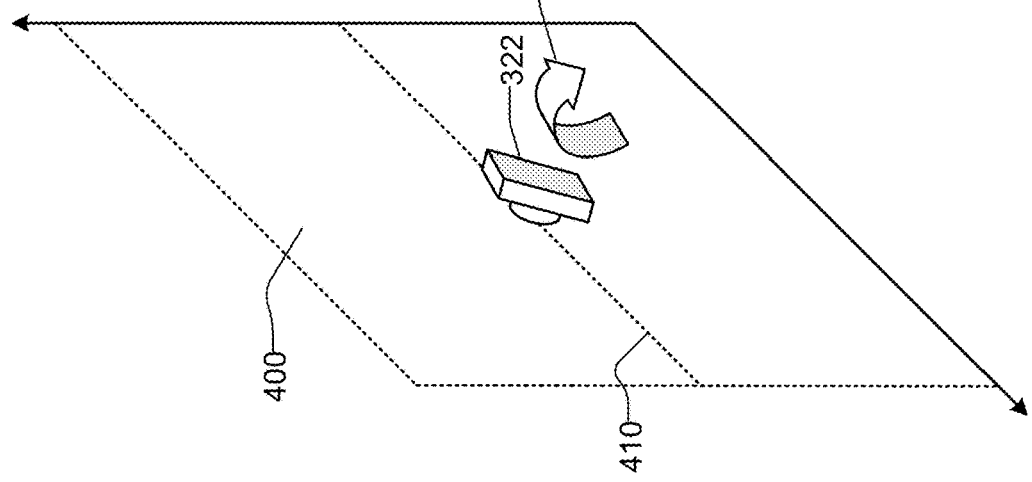
Figure 4A:
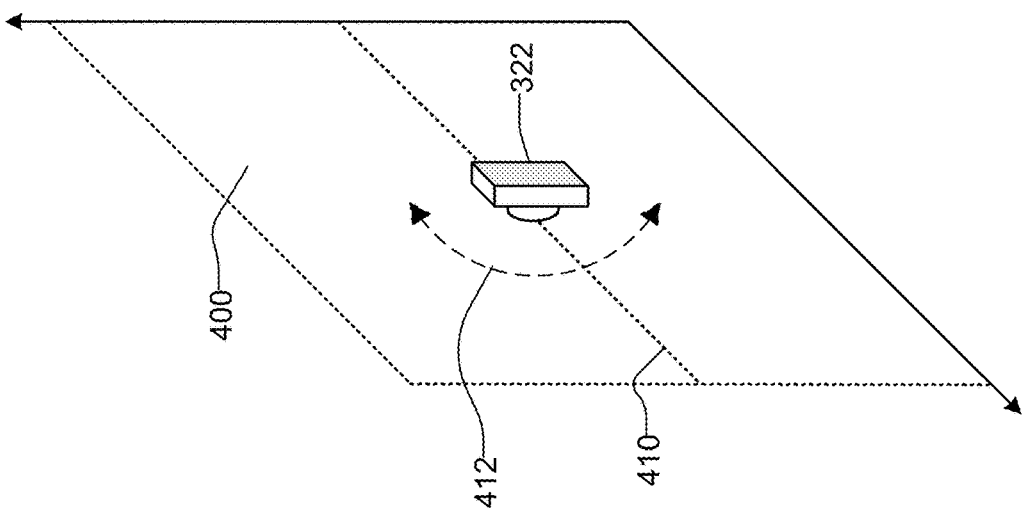
Figure 5B:
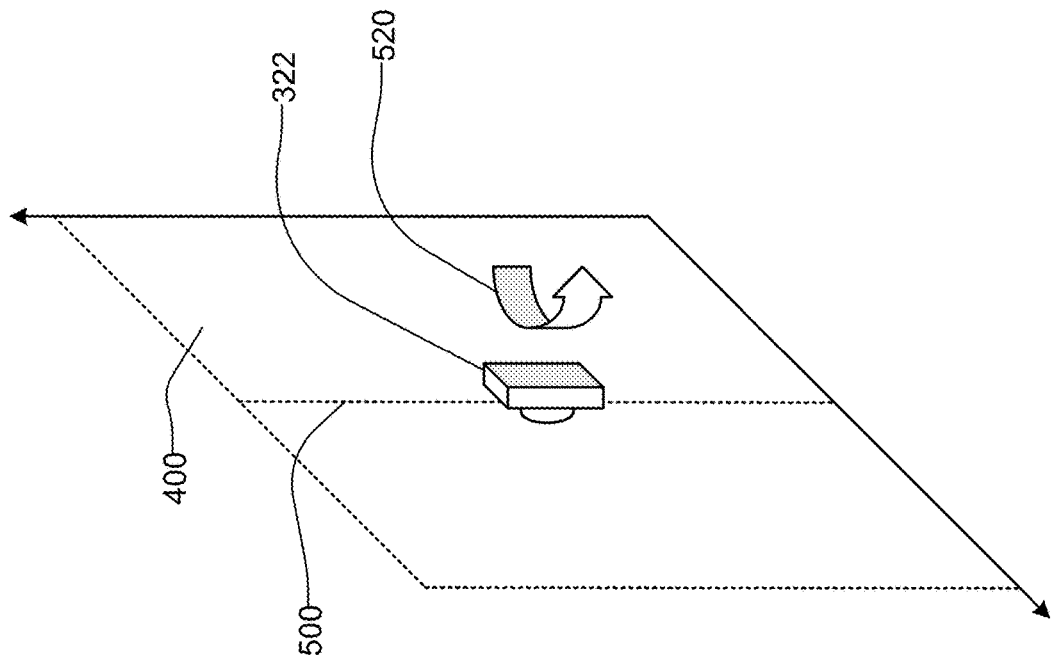
FIGS. 5A and 5B illustrate the camera being panned at various angles.
Figure 5A:
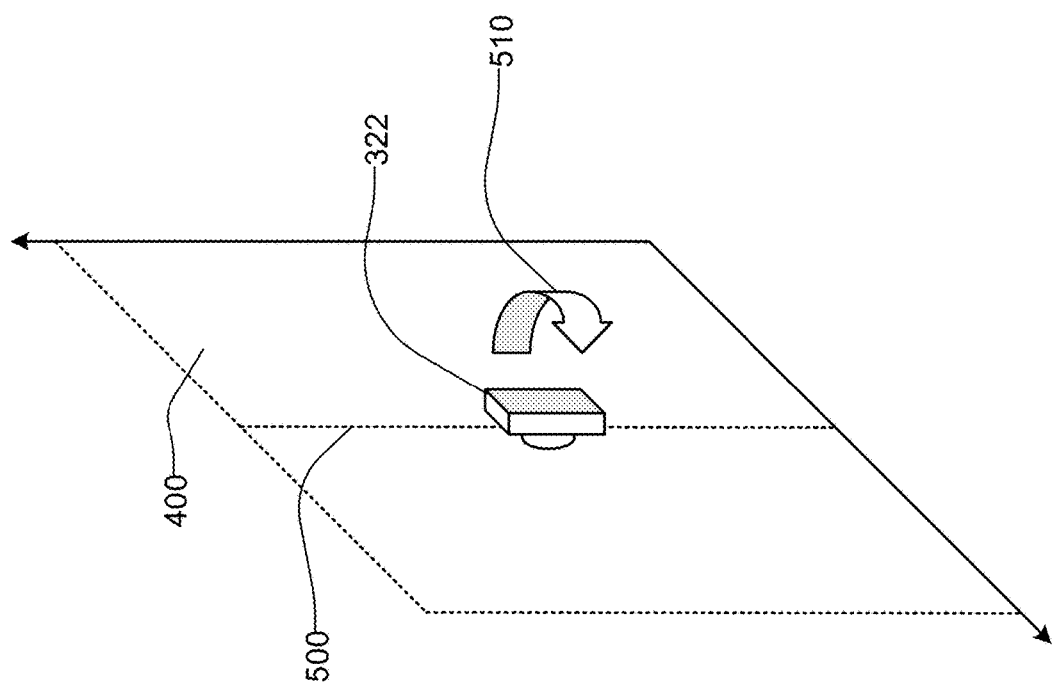

FIGS. 4A, 4B, 4C, 5A and 5B show examples of the camera orienting unit 324 orienting the camera 322 by, for example, rotating the camera 322 to tilt and pan the FOV of the camera 322. FIG. 4A shows a plane 400 which has the substantially same width (on an "X" axis) and height (on a "Y" axis) as the rear surface 314 of the display 310 and is substantially parallel to the rear surface 314 of the display 310. The plane 400 may be flush with or slightly spaced apart from the rear surface 314. The camera orienting unit 324 may tilt up and down the FOV of the camera 322 with respect to a line 410 substantially parallel to the X axis of the plane 400, which is shown by an arrow 412. FIG. 4B shows the camera 322 being rotated with respect to the line 410 in a direction shown by an arrow 420 to tilt up the FOV of the camera 322. FIG. 4C shows the camera 322 being rotated with respect to the line 410 in a direction shown by an arrow 430 to tilt down the FOV of the camera 322. As shown in FIGS. 5A and 5B, the camera orienting unit 324 may also rotate the camera 322 with respect to a line 500 on the plane 400 that is substantially parallel to the Y axis of the plane 400. FIG. 5A shows the camera 322 being rotated with respect to the line 500 in a direction shown by an arrow 510 to pan the FOV of the camera 322 to the right. FIG. 5B shows the camera 322 being rotated with respect to the line 500 in a direction shown by an arrow 520 to pan the FOV of the camera 322 to the left. The camera orienting unit 324 may also rotate the camera 322 in any diagonal directions by, for example, combining of the vertical rotation shown in FIGS. 4A, 4B and 4C and horizontal rotation shown in FIGS. 5A and 5B. Further, the camera orienting unit 324 may control zooming of the camera 322 to adjust a FOV size of the camera 322.

Figure 6C:
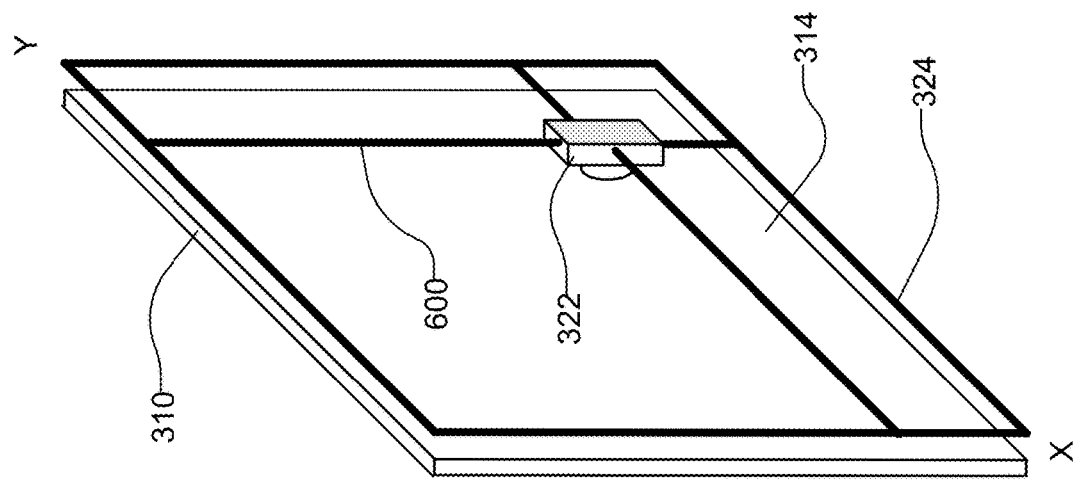
FIGS. 6A, 6B and 6C illustrate a camera orienting unit of the image capturing system shown in FIG. 3 moving the camera to position on various locations on a plane on a rear surface of a display of the image capturing system.
Figure 6B:
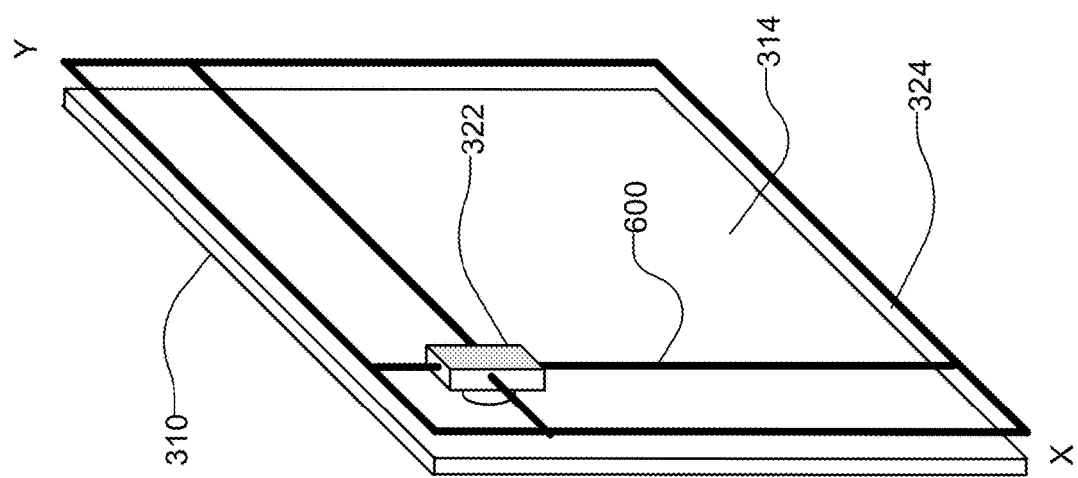
Figure 6A:
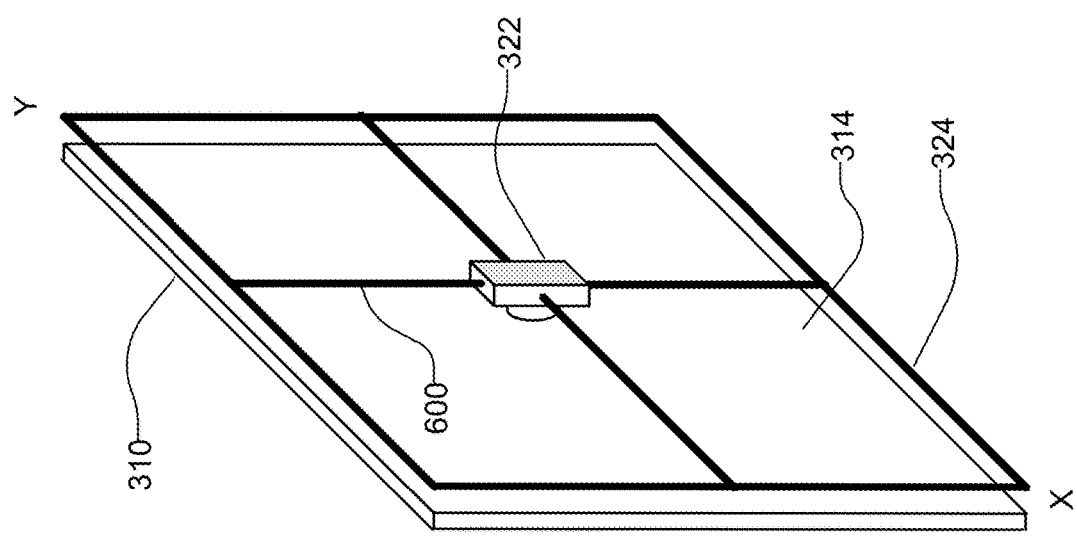

In addition to rotating the camera 322 and controlling zooming of the camera 322, the camera orienting unit 324 may move the camera 322 to orient the camera 322 to have a desired FOV that corresponds to Alice's FOV. For example, FIGS. 6A, 6B and 6C illustrate the camera orienting unit 324 including a sliding system 600 configured to move the camera 322 freely over the rear surface 314 of the display 310. The sliding system 600 may be motorized to position the camera 322 at a desired point on a plane defined by X and Y axes and substantially parallel to the rear surface 314 of the display 310. For example, based on Alice's FOV received from Alice's device 200A, the control unit 340 may detects a change of Alice's FOV which requires the camera 322 to be positioned near the top left corner of the rear surface 314 of the display 310. The control unit 340 may then calculate coordinates on the X and Y axes of the sliding system 600 that corresponds to the desired position of the camera 322 on the rear surface 314 of the display 310. As shown in FIG. 6B, the sliding system 600 may then move the camera 322 along the X and Y axes of the plane to position the camera 322 near the top left corner of the rear surface 314 of the display 310. Similarly, when a new FOV is received from Alice's device 200A which requires the camera 322 is to be positioned near the bottom right corner of the rear surface 314 of the display 310, the sliding system 600 may then move the camera 322 along the X and Y axes of the plane to position the camera 322 near the bottom right corner of the rear surface 314 of the display 310, as shown in FIG. 6C.

Figure 7A:
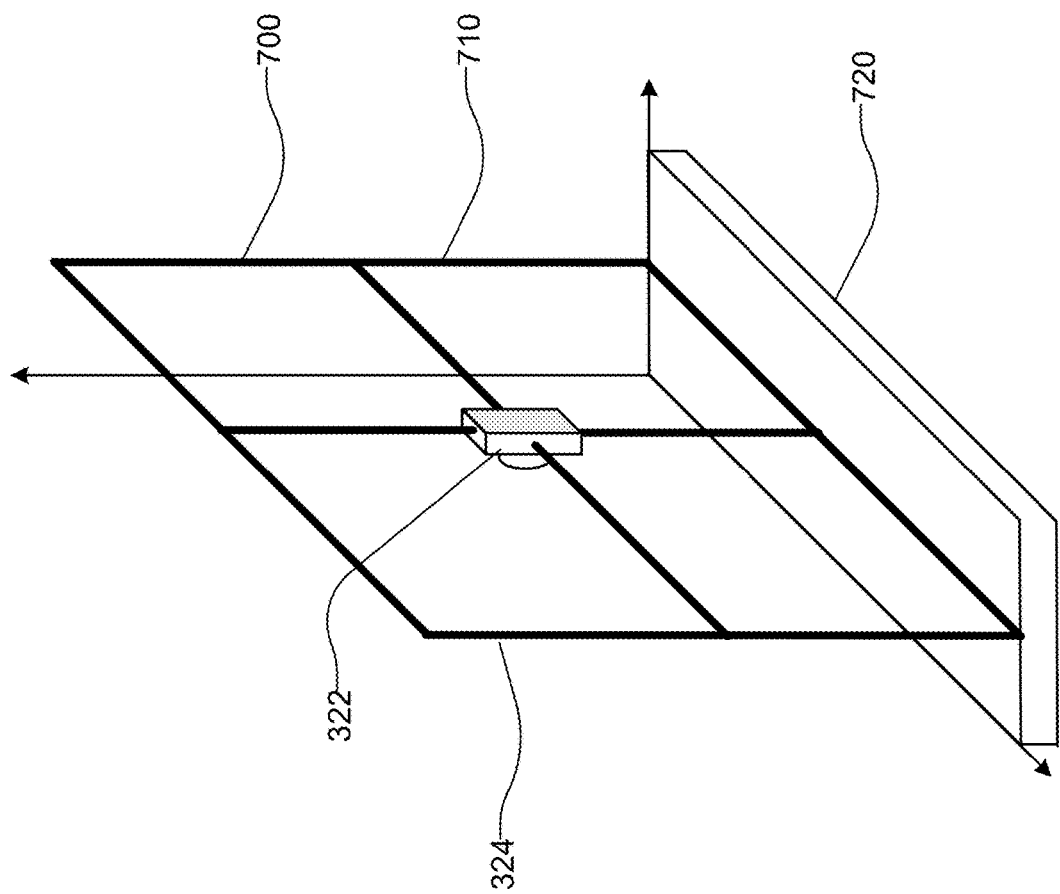
FIGS. 7A, 7B and 7C illustrate the camera orienting unit moving the camera in a three-dimensional (3D) space on the rear surface of the display.
Figure 7C:
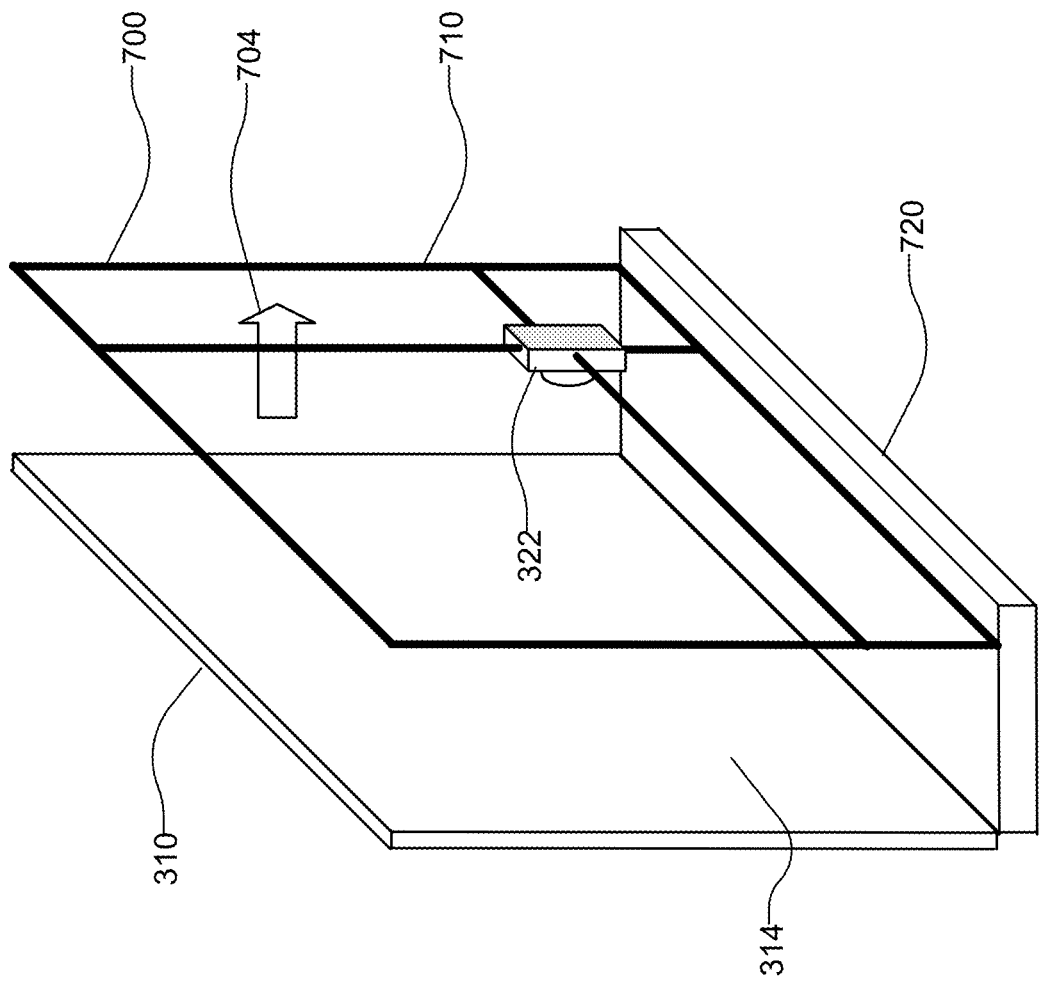
Figure 7B:
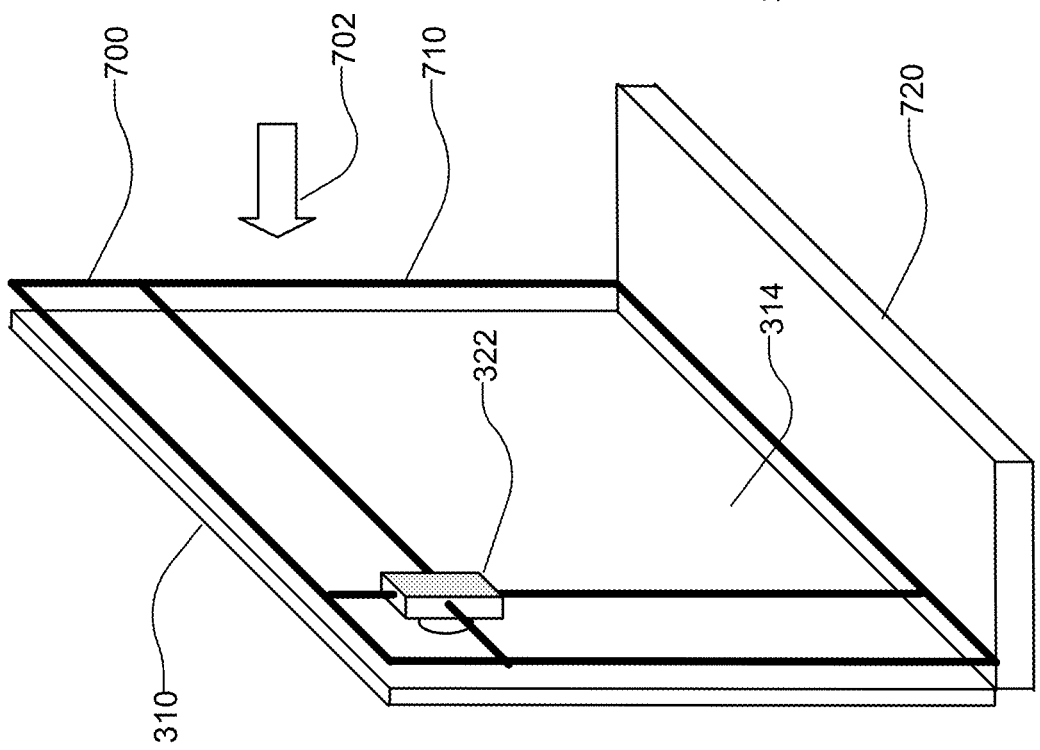

The camera orienting unit 324 may be configured to move the camera 322 in a 3D space on the rear surface 314 of the display 310. For example, as shown in FIG. 7A, the camera orienting unit 324 may include a 3D sliding system 700, which may include a XY sliding system 710 and a Z sliding system 720. Similar to the sliding system 600 shown in FIGS. 6A, 6B and 6C, the XY sliding system 710 may be configured to move the camera 322 along the X and Y axes of the plane substantially parallel to the rear surface 314 of the display 310. The Z sliding system 720 may be configured to move the XY sliding system 710 along a Z axis that is perpendicular to both the X and Y axes of the plane. Hence, the Z sliding system 720 may control a distance between the camera 322 and the rear surface 314 of the display 310. FIG. 7B shows the Z sliding system 720 moving the XY sliding system 710 toward the rear surface 314 of the display 310 as shown by an arrow 702. FIG. 7C shows the Z sliding system 720 moving the XY sliding system 710 away the rear surface 314 of the display 310 as shown by an arrow 704. As such, the camera orienting unit 324 may orient the camera 322 to have a desired FOV by rotating the camera 322, controlling zooming of the camera 322, moving the camera 322 on a 2D plane or 3D space over the rear surface 314 of the display 310.

In an implementation, two or more cameras may be used. For example, in FIG. 6A, the plane may be divided into a number of smaller areas of the same or different sizes, such as two areas (e.g., two halves, one large area and one small area, etc.), four arears (e.g., four quarters, two larger areas and two smaller areas, five areas (e.g., one center area and four side areas, etc.), etc. and each area may be provided with a camera which may be controlled, rotated and moved by the camera orienting unit 324. Similarly, in FIG. 7A, the 3D space behind the display 310 may be divided into a number of smaller spaces, and each space may be provided with its own camera which may be controlled, rotated and moved by the camera orienting unit 324. By having more camera to cover different areas, an amount of time to move the camera from one position to another may be reduced, and the camera orienting unit 324 may move and rotate the cameras in a more robust and responsive manner. This may also allow to provide a number of different views to remote viewers.

Figure 8A:
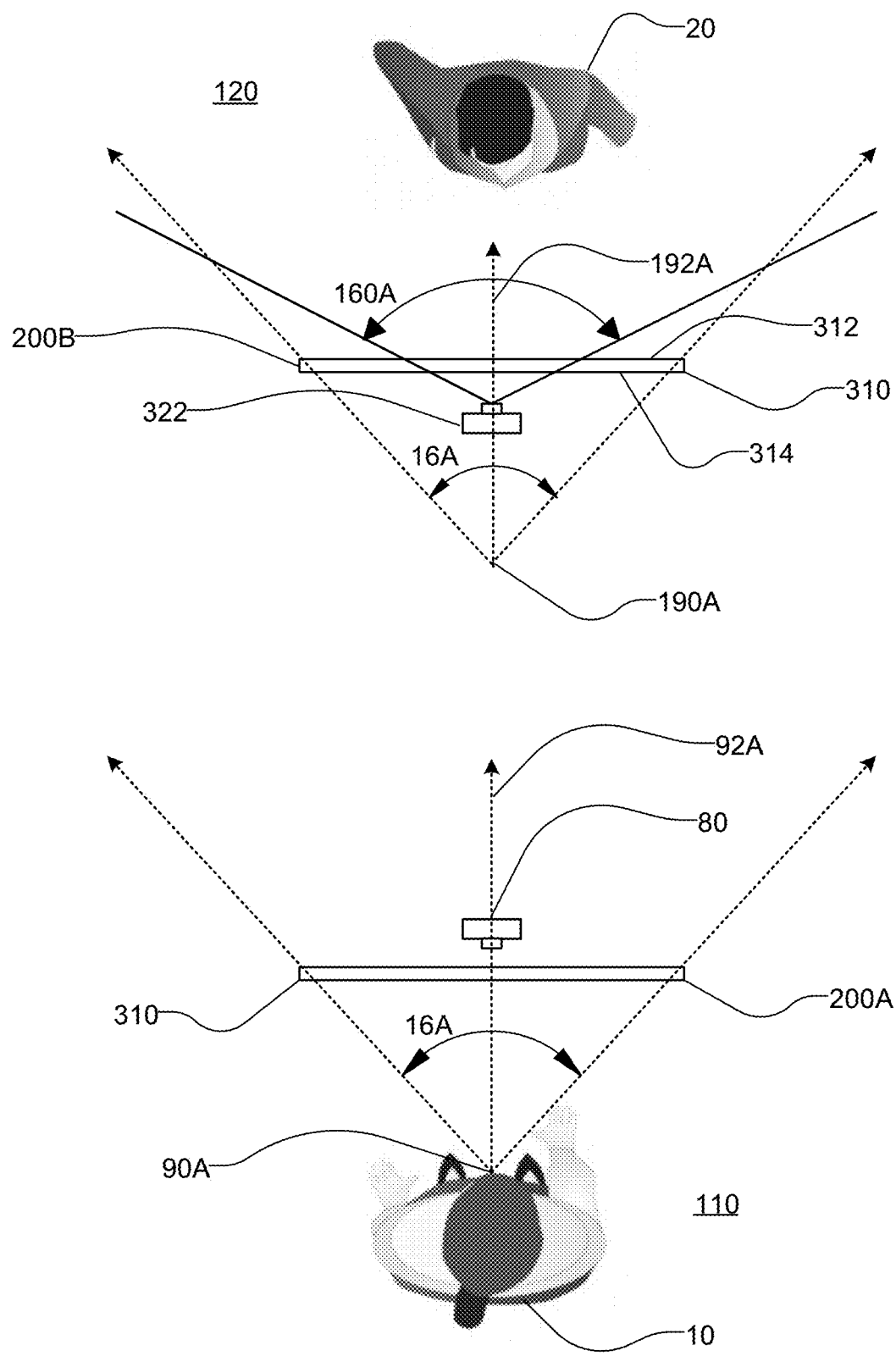

FIGS. 8A, 8B, 8C, 8D and 8E are top views of Alice 10 and Bob 20 facing their respective devices 200A and 200B, in which the camera 322 in Bob's device 200B is oriented based on Alice's FOV in order to have a local FOV corresponding to Alice's FOV. FIG. 8A shows Alice's device 200A having a camera 80 that captures an image of Alice 10. The camera 80 may be an infrared (IR) camera or depth camera, of which the main purpose is capturing Alice's head or eye direction or eye-gazing direction. Alternatively, the camera 80 may be the camera 322 of Alice's device 200A. Based on the captured image of Alice 10, Alice's device 200A may detect various position and direction information, such as Alice's position with respect to the display 310, Alice's head facing direction, Alice's eye gazing direction, etc. Based on the detected position and direction information, Alice's device 200A may determine Alice's FOV 16A. A configuration (e.g., width and height) of the display 310 may also be considered in determining Alice's FOV 16A because Alice's FOV 16A may be limited to a view defined by a display area of the display 310 or an application window displaying the transmitted image.

In an implementation, the camera 80 may continuously or periodically capture images of the first site 110. Based on the captured images of the first site 110, Alice's device 200A may track Alice's movements, positions with respect to the display 310, head-facing directions, eye-gazing directions, etc. and continuously or periodically determine and transmit Alice's FOV to Bob's device 200B. Referring to FIG. 8A, Alice's FOV 16A may be defined by Alice's eye location (e.g., the middle point between Alice's eye sockets) 90A with respect to the display 310, Alice's eye gazing direction 92A with respect to the display 310, view boundaries defined by the width and height of the display 310, etc. Alice's device 200A may detect that Alice 10 is positioned at a horizontal center with respect to the display 310 and looking at the center of the display 310 in a direction perpendicular to the display 310. Based on the detected position and direction information, Alice's device 200A may determine Alice's FOV 16A that is substantially symmetrical with respect to the center of the display 310. Alice's device 200A may then transmit Alice's FOV 16A to Bob's device 200B via the network 30.

Upon receiving Alice's FOV 16A, Bob's device 200B may determine a local FOV 160A of the camera 322 with respect to its display 310. For example, Bob's device 200B may determine that, based on Alice's FOV 16A, a virtual eye location 190A with respect to the display 310 corresponding to Alice's eye location 90A, a virtual eye gazing direction 192A corresponding to Alice's eye gazing direction 92A, a virtual FOV boundary defined by edges of the display 310, etc. Based on the virtual eye location 190A, virtual eye gazing direction 192A, virtual FOV boundary, etc., Bob's device 200B may perform rotating or moving the camera 322, controlling zooming of camera 322 to orient the camera 322, etc. to have the local FOV 160A corresponding to Alice's FOV 16A. For example, the camera 322 may be moved to be positioned on a line extending from the virtual eye location 190A along the virtual eye gazing direction 192A. The camera 322 may also be rotated to face in a direction that is substantially the same as the virtual eye gazing direction 192A. The camera 322 may be also controlled to zoom in or out or moved closer to or away from the display 310 based on a distance between the virtual eye location 190A and the display 310. Upon being oriented to have the local FOV 160A corresponding Alice's FOV 16A, the camera 322 may be controlled to capture an image of the second site 120. The captured image may then be transmitted to Alice's device 200A and displayed on the display 310 of Alice's device 200A.

Due to size and configuration restrictions, the camera 322 at Bob's device 200B may not be positioned to have the same distance from the display 310 as the virtual eye location 190A is virtually positioned. In some situations, the camera 322 may be positioned closer to the display 310 than the virtual eye location 190 is positioned, and hence the local FOV 160A may be wider than Alice's FOV 16A, capturing areas of the second site 120 that are outside Alice's FOV 16A. To match Alice's FOV 16A, Bob's device 200A may process the captured image to eliminate data related to the area outside Alice's FOV, which may reduce the amount of data transmitted to Alice's device 200A. Bob's device 200A may also perform up-scaling or down-scaling of the capture image to a desired image format (e.g., 1920×1080 resolution) for transmission to Alice's device 200A. Further, the captured image may be warped to compensate distortions introduced to the captured image. Alternatively, Bob's device 200B may transmit the image as captured by the camera 322 to Alice's device 200A, which may then process the received image to eliminate the areas that cannot be displayed on its display 310 or to perform warping of the received image.

Figure 8B:
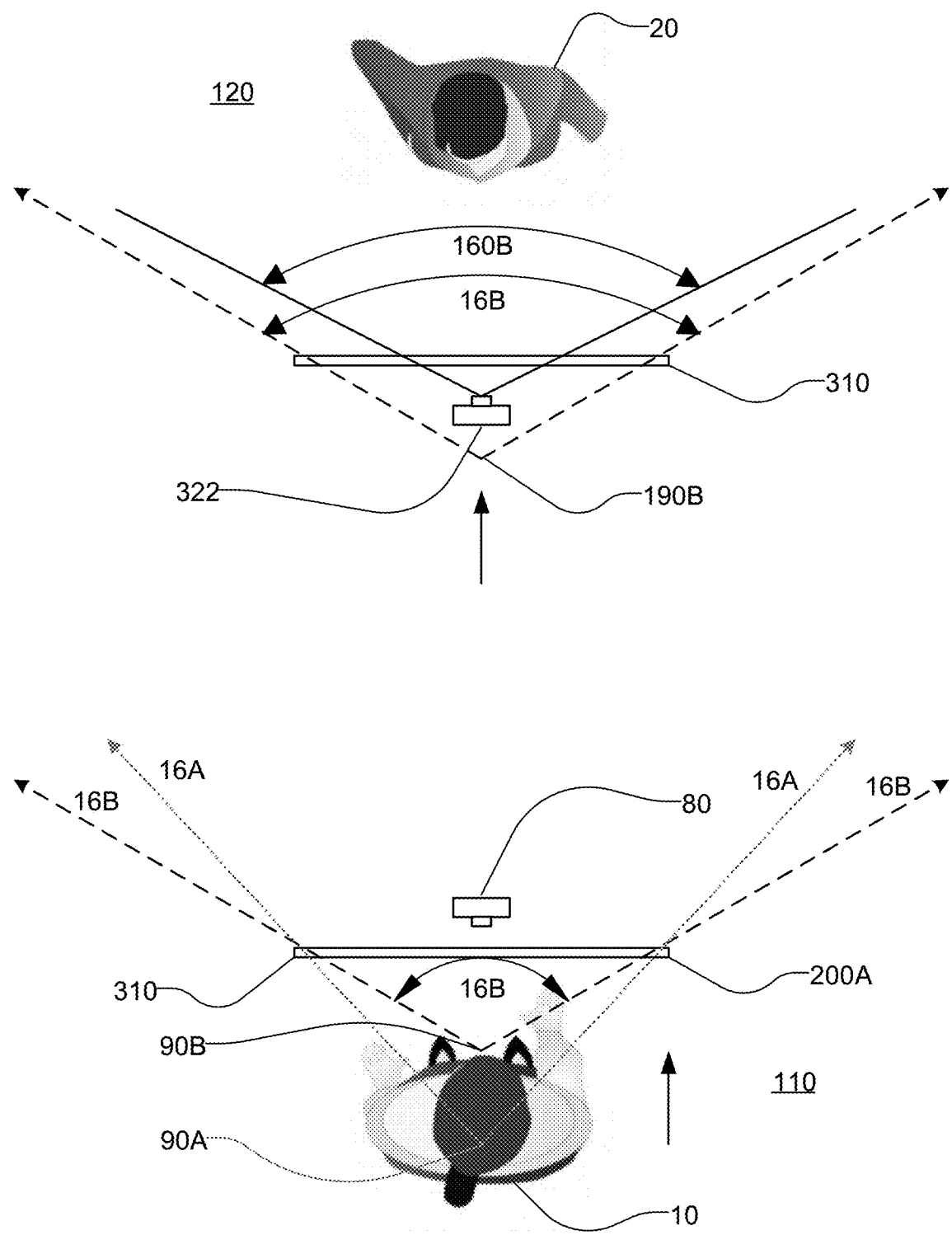

FIG. 8B shows Alice 10 moving closer to the display 310 of her device 200A, which may change Alice's eye location from location 90A to 90B. Upon detecting Alice's movement, Alice's device 200A may determine Alice's new FOV 16B, which is wider than her previous FOV 16A shown in FIG. 8A, and transmit the new FOV 16B. Upon receiving Alice's new FOV 16B, Bob's device 200B may move the camera 322 closer to the display 310 and/or physically or electronically control zooming of the camera 322 to orient the camera 322 to have a new local FOV 160B corresponding to Alice's FOV 16B. Bob's device 200B may then control the camera 322 to capture an image of the second site 120. Due to the shortened distance between the camera 322 and Bob 20, the captured image may show more peripheral areas of the second site 120 that were not shown in the previous image captured with the FOV 160A shown in FIG. 8A, which may result in Bob's image occupying a smaller portion of the captured image. However, when the captured image is displayed at Alice's device 200A, Bob 20 may look bigger to Alice 10 because Alice 10 is physically closer to her display 310.

FIG. 8C shows Alice 10 moving to the left from her previous position in FIG. 8A while maintaining the distance from the display 310 and keeping her eye-gazing direction perpendicular to the display 310. Such movement may result in Alice 10 having a new FOV 16C, which allows Alice 10 to see more peripheral areas on the right side and less peripheral areas on the left side when compared to the previous FOV 16A. Upon receiving the new FOV 16C, Bob's device 200B may move the camera 322 to have a new local FOV 160C corresponding to Alice's FOV 16C. To capture a perspective view of Bob 20 from the same position as Alice's new eye location 90C, the camera 322 may be moved to be on a line extending perpendicular to the display 310 from a virtual eye position 190C corresponding to the Alice's eye position 90C. Also, similar to Alice's head direction, the camera 322 may face in a direction perpendicular to the display 310. Such synchronization between Alice's movement and position and the orientation of the camera 322 may ensure a natural eye contacts between Alice 10 and Bob's image displayed via Alice's device 200A.

Figure 8D:
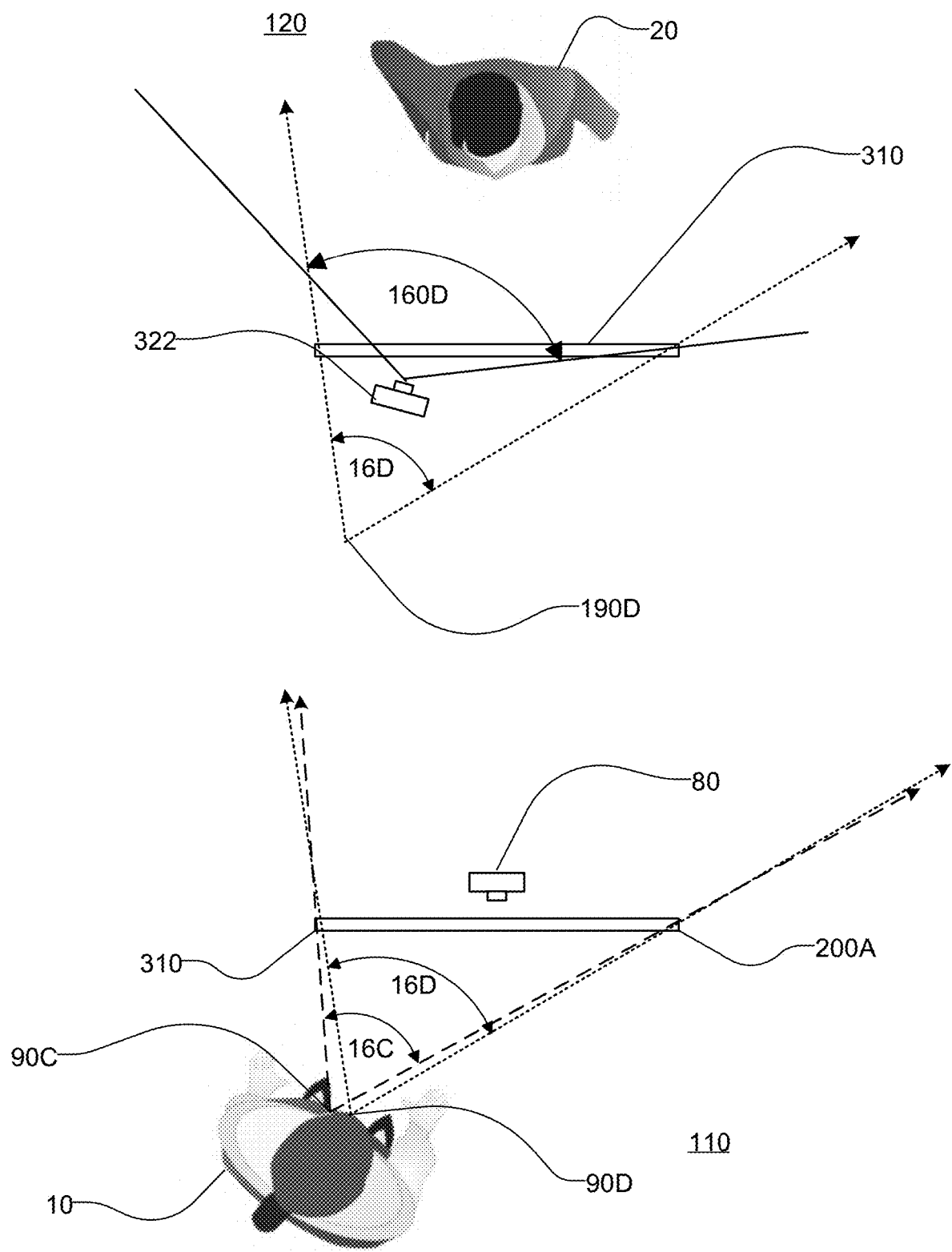

FIG. 8D shows Alice 10 positioned on the same position as FIG. 8C with her entire body (including her head) tilted in a clockwise direction while maintaining her eye-gazing direction perpendicular to her head. Upon detecting such changes, Alice's device 200A may determine a new FOV 16D, which may be slightly different from her previous FOV 16C. For example, the change to Alice's head-facing direction may result in shifting Alice's eye location from the location 90C to a new eye location 90D, which is slightly to the right from the previous FOV 16C and slight away from the display 310. Alice's new FOV 16D may allow Alice 10 to see the left peripheral area slightly more and the right peripheral area slightly less. Upon receiving Alice's new FOV 16D, Bob's device 200B may orient the camera 322 by slightly moving the camera 322 to the right and slight away from the display 310 and horizontally tilting the camera 322 in a clockwise direction such that the camera 322 has a new local FOV 160D corresponding to Alice's FOV 16D. Then, Bob's device 200B may cause the newly oriented camera 322 to capture an image of the second site 120, which is transmitted to Alice's device 200A to display the image of the second site 120 captured with the new FOV 160D.

Figure 8E:
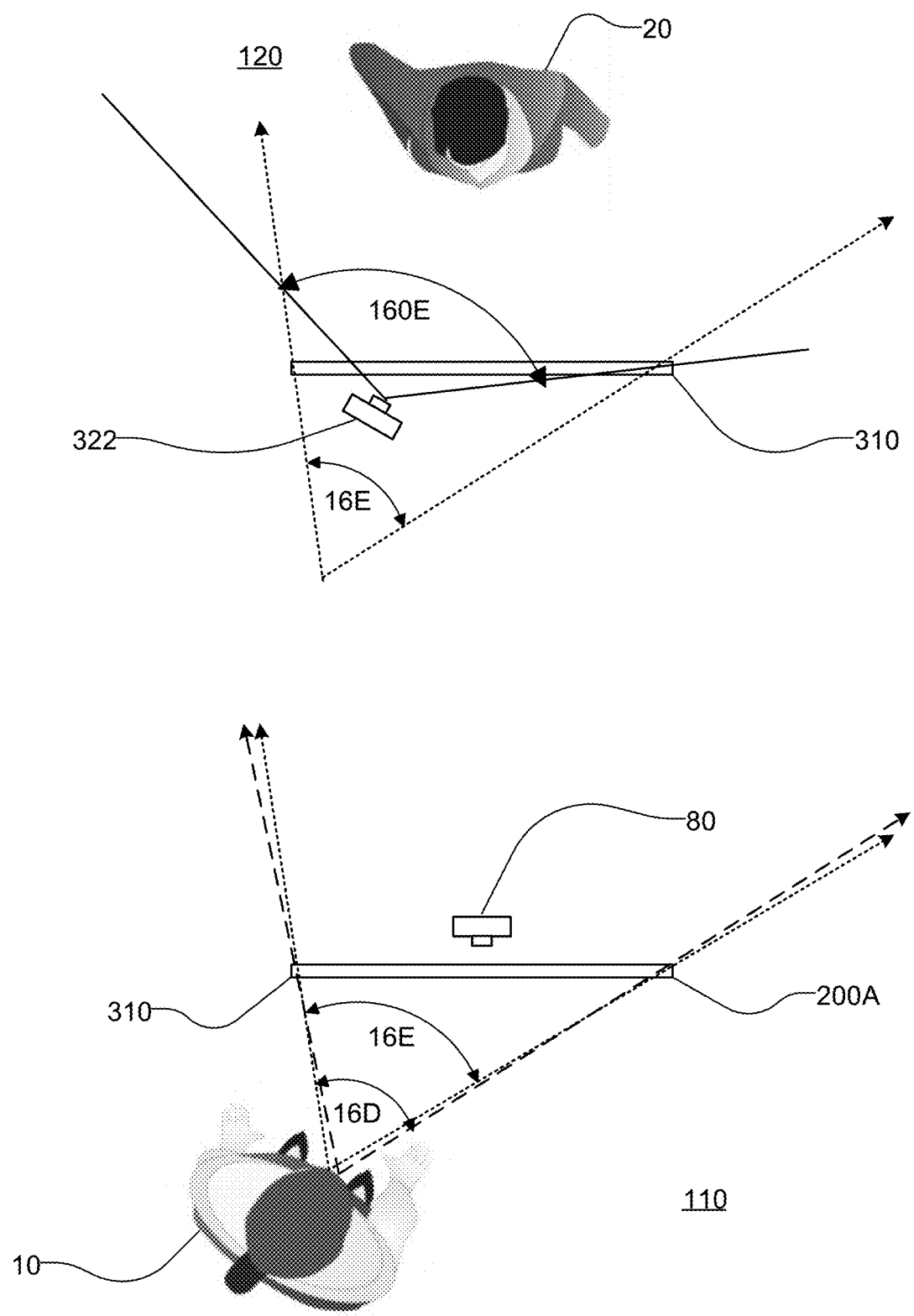

FIG. 8E shows Alice 10 positioned on the same position as FIG. 8D and having the same head-facing direction as FIG. 8D with her eye-gazing direction being changed to the left side, which may result in slightly changing her eye location and also slightly changing her FOV from the previous FOV 16D to a new FOV 16E. Upon receiving the new FOV 16E, Bob's device 200B may move and rotate the camera 322 to have a new local FOV 160E corresponding to Alice's new FOV 16E. Then, Bob's device 200B may operate the camera 322 to capture a new image of the second site 120, which may show the right peripheral area slightly more and the left peripheral area slightly less, and transmit the captured image to Alice's device 200A, which displays the newly captured image of the second site 120.

As such, Bob's device 200B may be configured to orient the camera 322 in response to changes to Alice's FOV. In some circumstances, such changes to Alice's FOV may be very small. Bob's device 200B, however, may be configured to and operate to be actively responsive to such small FOV changes to ensure that the images of the second site 120 change in response to Alice's movements. This may allow Alice 10 to perceive Bob's images displayed via her device 200A much more realistic, thereby providing more immersive and engaging video conferencing experiences. Also, by rotating or moving the camera 322, controlling zooming of the camera 322, etc. the camera 322 may be oriented to have a FOV which corresponds to Alice's FOV, and hence only one (or a few more) camera may be needed to achieve a more lifelike video conferencing experience. Hence, Bob's device 200B may not need a large number of cameras, such as light field cameras, which are expensive and relatively bulky, to capture images to match Alice's constantly changing FOV. Also, by using a single (or a few more) camera, an amount of data transmitted to a viewer's device is significantly reduced. Further, Alice's device 200A may display real life-like images of Bob without using additional enhancement equipment (e.g., AR/VR headgear, glasses, etc.).

Figure 9:
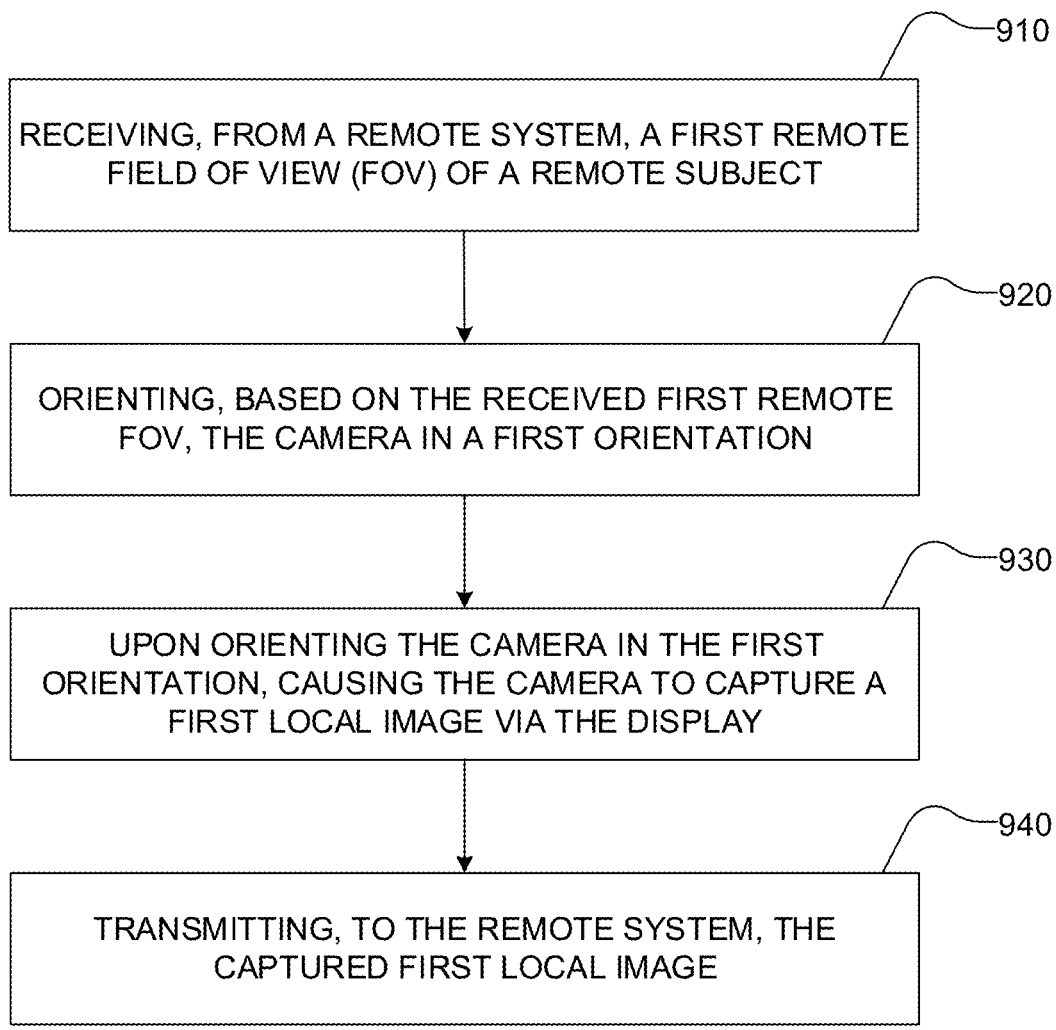
FIG. 9 is a flow diagram showing an implementation of a method for capturing a local image for transmission to a remote system.

FIG. 9 is a flow diagram showing an implementation of a process of operating a system for capturing a local image for transmission to a remote system. The system may include (i) a display having a front surface facing a local subject and a rear surface facing opposite to the front surface, and (ii) a camera positioned on the rear surface of the display and configured to capture a local image through the display. At step 910, the system may receive, from a remote system via a communication network, a first remote field of view (FOV) of a remote subject. At step 920, the system may orient, based on the received first remote FOV, the camera in a first orientation, wherein the camera oriented in the first orientation has a first local FOV corresponding to the first remote FOV received from the remote system. At step 930, upon orienting the camera in the first orientation, the system may cause the camera to capture a first local image through the display. At step 940, the system may transmit, to the remote system via the communication network, the captured first local image.

In some circumstances, Bob 20 may be positioned away from the center of the local FOV or Bob's head-facing direction or eye-gazing direction may be off from the center of the local FOV. Bob's device 200B may then perform an offsetting operation to have Bob's image to be positioned at the center of the local FOV or Bob's head-facing direction or eye-gazing direction is directed towards the center of the local FOV. For example, FIG. 10 shows Alice 10 being positioned at the same location as shown in FIG. 8A with the same eye location 90A and FOV 16A. On the other hand, Bob 20 is positioned on the right side of the local FOV 160A, which is determined based on Alice's FOV 16A. In this situation, a captured image of the second site 120 may show Bob 20 shifted to the right from the center of the local FOV 160A. Upon detecting such deviation, Bob's device 200B may adjust the orientation of the camera 322 to offset a distance between the center of the local FOV 160A and Bob's current portion within the local FOV 160A. For example, Bob's device 200B may re-orient the camera 322 by horizontally moving the camera 322 to the right such that the camera 322 may have a new FOV 160X, in which Bob 20 is positioned at the center. This may allow Bob's device 200B to capture and transmit an image of the second site 120, in which Bob 20 is positioned at the center. Hence, Alice 10 may not need to tilt her body or head to the right to maintain the eye contact with Bob's image. In certain circumstances, Bob 20 may be positioned further away from the center of the local FOV, which may make it difficult for the camera 322 to capture Bob's complete image even after adjusting the orientation of the camera 322. In such case, Bob's device 200B may warp the captured image to make Bob's image look as normal as possible prior to transmitting to Alice's device 200A. Such image normalization may be performed by Alice's device 200A after receiving the captured image form Bob's device 200B. Such image normalization may be performed periodically at a predetermined interval (e.g., 30 frames or 5 minutes) by Bob's device 200B, Alice's device 200A or both in a complementary manner.

FIG. 11 shows Alice 10 being positioned at the same location as shown in FIG. 8A with the same eye location 90A and FOV 16A. Bob 20 is positioned at the center of the local FOV 160A corresponding to Alice's FOV 16A with his head-facing direction and eye-gazing directions shifted to a left side of the local FOV 16A. This may happen when Alice's image is displayed via a window positioned on the right side of the front surface 312 of the display 310 at Bob's device 200B. In such situation, Bob 20 may be making an eye contact with Alice's image displayed on the display 310, but Bob's image 20 captured with the local FOV 160A may not be making an eye contact with Alice 10. To offset an angular difference between the center of the local FOV 160A and Bob's head-facing direction or eye-gazing direction, Bob's device 200B may adjust the orientation of the camera 322 to have a new local FOV 160Y such that Bob's position, head-facing direction and/or eye-gazing direction are positioned at the center of the local FOV 160Y. The orientation of the camera 322 may be adjusted by horizontally moving the camera 322 to the left and rotating the camera 322 to be on a line 1100 coinciding with Bob's head-facing direction or eye-gazing direction 1000. Due to constructional limitations, the camera 322 may not be oriented to accurately match Bob's head-facing direction or eye-gazing direction 1000. In such cases, the camera 322 may be moved and rotated as much as possible to match Bob's head-facing direction or eye-gazing direction 1100. Bob's device 200B may then capture an image of the second site 120 and warp Bob's image to look as normal as possible. As such, the orientation of camera 322 may be adjusted to offset a distance between the center of the local FOV and Bob's position with respect to the local FOV. The orientation of camera 322 may also be adjusted to offset an angular difference between the center of the local FOV and Bob's head-facing direction or eye-gazing direction. This may allow Alice 10 to maintain an eye contact with Bob's image displayed on Alice's device 200A even when Bob is not positioned or looking at the center of the display 310 of Bob's device 200B.

Figure 12:
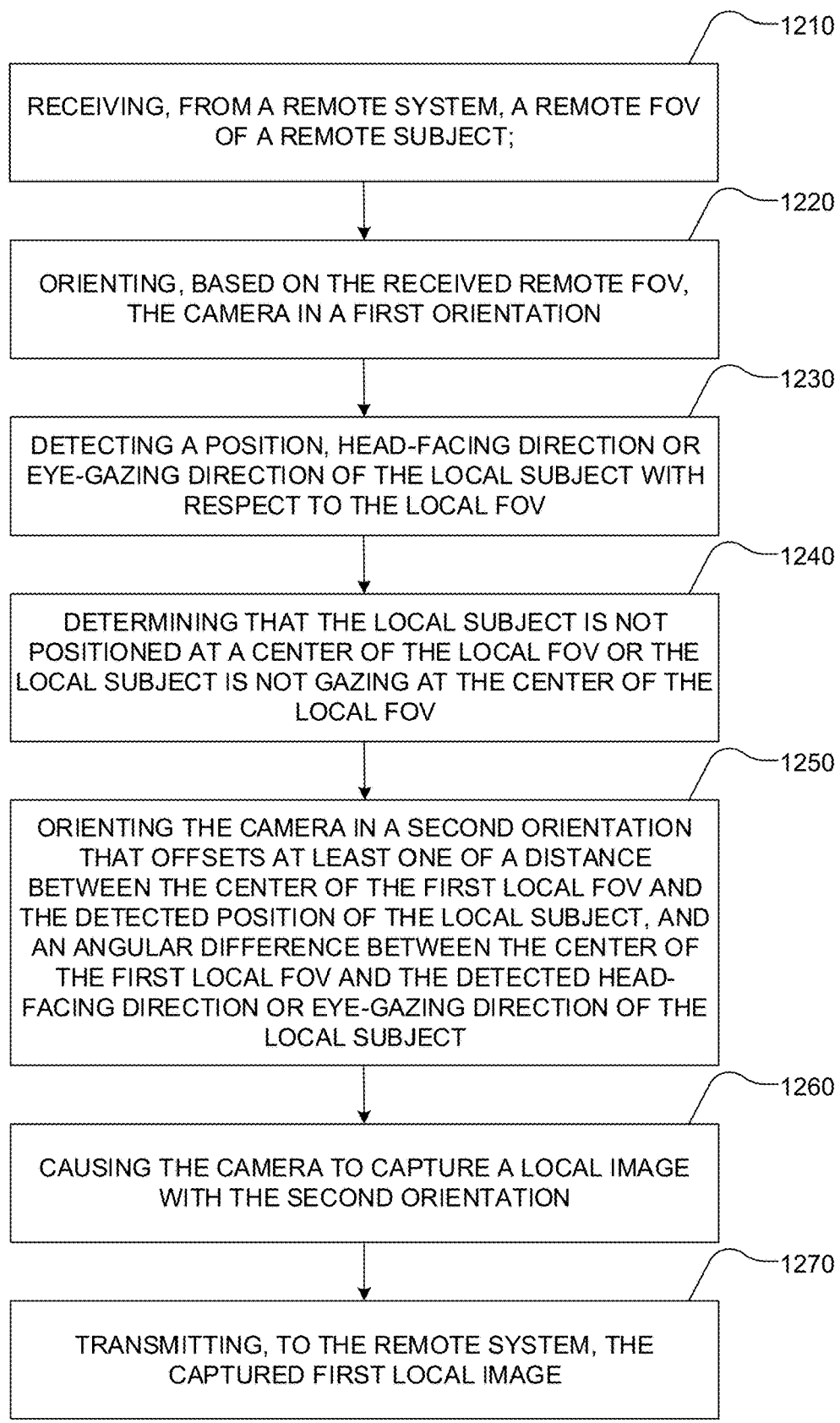
FIG. 12 illustrates is a flow diagram showing an implementation of a method for adjusting an orientation of the camera to offset deviations.

FIG. 12 is a flowchart showing another implementation of orienting a camera to offset a distance between the center of the local FOV and a local subject's position with respect to the local FOV or an angular difference between the center of the local FOV and a head-facing direction or eye-gazing direction. Such offsetting may be performed periodically (e.g., once in every 30 frames) or when a detected movement exceeds a predetermined threshold (e.g., 1 inch). At step 1210, the system may receive, from a remote system via a communication network, a remote field of view (FOV) of a remote subject. At step 1220, the system may orient, based on the received remote FOV, the camera in a first orientation, wherein the camera oriented in the first orientation has a local FOV corresponding to the remote FOV received from the remote system. At step 1230, the system may detect at least one of a position, head-facing direction and eye-gazing direction of the local subject with respect to the local FOV. At step 1240, the system may determine, based on at least one of the detected position, head-facing direction and eye-gazing direction of the local subject with respect to the local FOV, that the local subject is not positioned at a center of the local FOV or the local subject is not gazing at the center of the local FOV. At step 1250, the system may orient the camera in a second orientation that offsets at least one of a distance between the center of the first local FOV and the detected position of the local subject and an angular difference between the center of the first local FOV and the detected head-facing direction or eye-gazing direction of the local subject. At step 1260, the system may cause the camera to capture a local image with the second orientation. At step 1270, the system may transmit, to the remote system via the communication network, the captured first local image.

Figure 13:
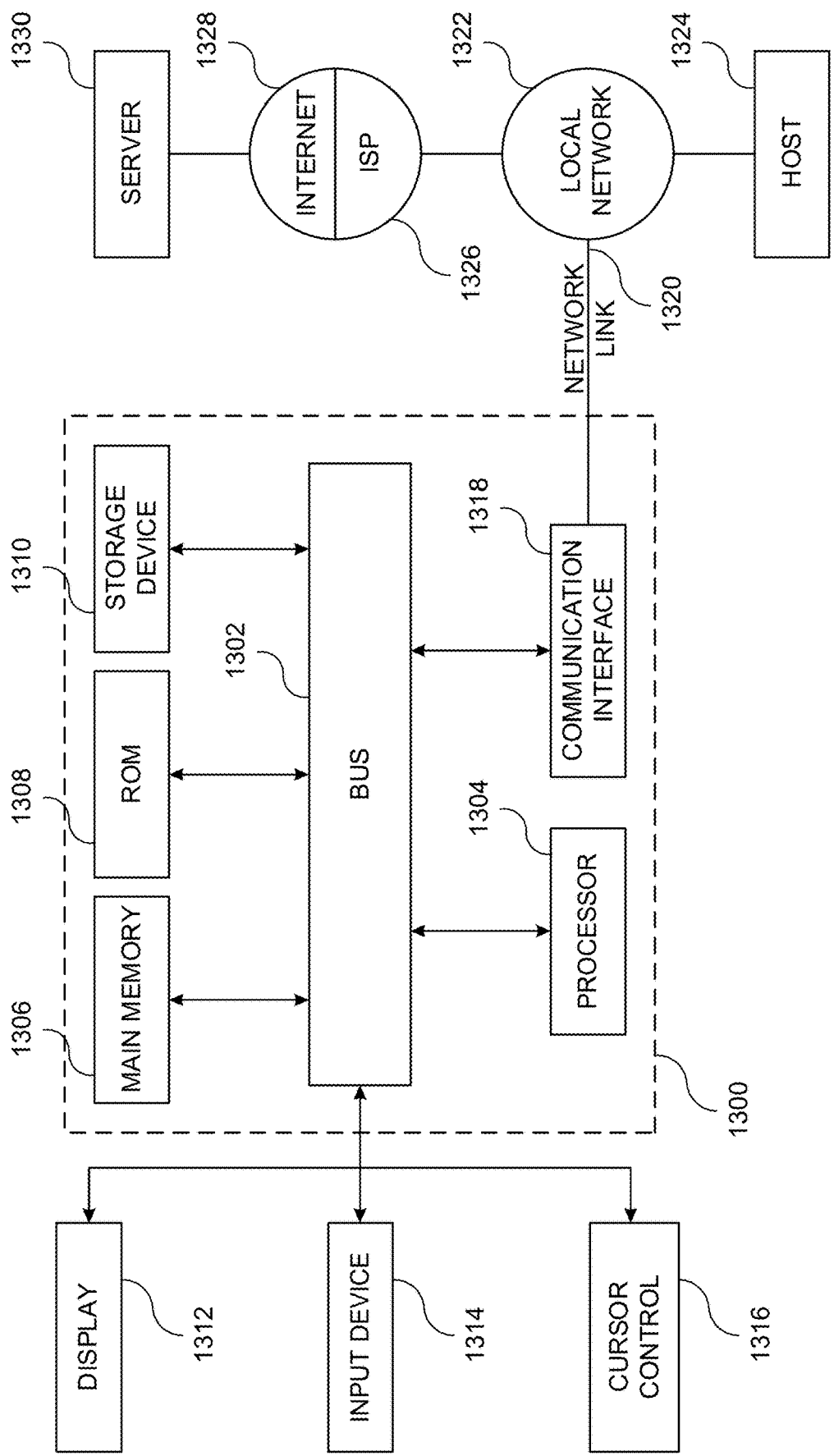
FIG. 13 is a block diagram showing an example computer system upon which aspects of this disclosure may be implemented.

FIG. 13 is a block diagram showing an example computer system 1300 upon which aspects of this disclosure may be implemented. The computer system 1300 may include a bus 1302 or other communication mechanism for communicating information, and a processor 1304 coupled with the bus 1302 for processing information. The computer system 1300 may also include a main memory 1306, such as a random-access memory (RAM) or other dynamic storage device, coupled to the bus 1302 for storing information and instructions to be executed by the processor 1304. The main memory 1306 may also be used for storing temporary variables or other intermediate information during execution of instructions to be executed by the processor 1304. The computer system 1300 may implement, for example, the telepresence devices 200A and 200B.

The computer system 1300 may further include a read only memory (ROM) 1308 or other static storage device coupled to the bus 1302 for storing static information and instructions for the processor 1304. A storage device 1310, such as a flash or other non-volatile memory may be coupled to the bus 1302 for storing information and instructions.

The computer system 1300 may be coupled via the bus 1302 to a display 1312, such as a liquid crystal display (LCD), for displaying information. One or more user input devices, such as a user input device 1314, cursor control 1316, etc. may be coupled to the bus 1302, and may be configured for receiving various user inputs, such as user command selections and communicating these to the processor 1304, or to the main memory 1306. The user input device 1314 may include physical structure, or virtual implementation, or both, providing user input modes or options, for controlling, for example, a cursor, visible to a user through display 1312 or through other techniques, and such modes or operations may include, for example virtual mouse, trackball, or cursor direction keys.

The computer system 1300 may include respective resources of the processor 1304 executing, in an overlapping or interleaved manner, respective program instructions. Instructions may be read into the main memory 1306 from another machine-readable medium, such as the storage device 1310. In some examples, hard-wired circuitry may be used in place of or in combination with software instructions. The term "machine-readable medium" as used herein refers to any medium that participates in providing data that causes a machine to operate in a specific fashion. Such a medium may take forms, including but not limited to, non-volatile media, volatile media, and transmission media. Non-volatile media may include, for example, optical or magnetic disks, such as storage device 1310. Transmission media may include optical paths, or electrical or acoustic signal propagation paths, and may include acoustic or light waves, such as those generated during radio-wave and infra-red data communications, that are capable of carrying instructions detectable by a physical mechanism for input to a machine.

The computer system 1300 may also include a communication interface 1318 coupled to the bus 1302, for two-way data communication coupling to a network link 1320 connected to a local network 1322. The network link 1320 may provide data communication through one or more networks to other data devices. For example, the network link 1320 may provide a connection through the local network 1322 to a host computer 1324 or to data equipment operated by an Internet Service Provider (ISP) 1326 to access through the Internet 1328 a server 1330, for example, to obtain code for an application program.

In the following, further features, characteristics and advantages of the invention will be described by means of items:

Item 1. A system for capturing a local image for transmission to a remote system, comprising: a display having a front surface facing a local subject and a rear surface facing opposite to the front surface; an image capturing unit comprising (i) a camera positioned on the rear surface of the display and configured to capture a local image through the display, and (ii) a camera orienting unit configured to orient the camera; a processor; and a computer-readable medium in communication with the processor. The computer-readable medium comprising executable instructions that, when executed by the processor, cause the processor to control the system to perform functions of: receiving, from a remote system via a communication network, a first remote field of view (FOV) of a remote subject; causing, based on the received first remote FOV, the camera orienting unit to orient the camera in a first orientation, wherein the camera oriented in the first orientation has a first local FOV corresponding to the first remote FOV received from the remote system; upon orienting the camera in the first orientation, causing the image capturing unit to capture a first local image through the display; and transmitting, to the remote system via the communication network, the captured first local image.

Item 2. The system of Item 1, wherein, for causing the camera orienting unit to orient the camera in the first orientation, the instructions, when executed by the processor, further cause the processor to control the system to perform causing the camera orienting unit to rotate the camera or control zooming of the camera.

Item 3. The system of Item 2, wherein, for causing the camera orienting unit to orient the camera in the first orientation, the instructions, when executed by the processor, further cause the processor to control the system to perform causing the camera orienting unit to move the camera on the rear surface of the display.

Item 4. The system of Item 3, wherein, for causing the camera orienting unit to orient the camera in the first orientation, the instructions, when executed by the processor, further cause the processor to control the system to perform at least one of: causing the camera orienting unit to move the camera on a plane substantially parallel to the rear surface of the display; and causing the camera orienting unit to move the camera in a three-dimensional (3D) space on the rear surface of the display.

Item 5. The Item of claim 1, wherein, the instructions, when executed by the processor, further cause the processor to control the system to perform processing the captured first local image to emulate at least one of rotating, moving and zooming of the camera.

Item 6. The Item of claim 1, where the instructions, when executed by the processor, further cause the processor to control the system to perform: after receiving the first remote FOV, receiving, from the remote system via the communication network, the second remote FOV of the remote subject that is different from the first remote FOV; in response to receiving the second remote FOV of the remote subject, carrying out one of: performing (i) causing, based on the received second remote FOV, the camera orienting unit to orient the camera in a second orientation, wherein the camera oriented in the second orientation has a second local FOV corresponding to the second remote FOV received from the remote system, and (ii) upon orienting the camera in the second orientation, causing the image capturing unit to capture a second local image through the display; performing (i) causing the image capturing unit to capture a third local image through the display, and (ii) processing, based on the received second remote FOV, the captured third local image to emulate at least one of rotating, moving and zooming of the camera; and performing (i) causing, based on the received second remote FOV, the camera orienting unit to orient the camera in a third orientation, (ii) upon orienting the camera in the third orientation, causing the image capturing unit to capture a fourth local image through the display, and (iii) processing, based on the received second remote FOV, the captured fourth local image to emulate at least one of rotating, moving and zooming of the camera; and transmitting, to the remote system via the communication network, the captured second local image, the processed third local image or the processed fourth local image.

Item 7. The Item of claim 1, wherein, the instructions, when executed by the processor, further cause the processor to control the system to perform at least one of: detecting a position of the local subject with respect to the first local FOV; detecting a head-facing direction of the local subject with respect to the first local FOV; and detecting an eye-gazing direction of the local subject with respect to the first local FOV.

Item 8. The Item of claim 7, wherein, for causing the camera orienting unit to orient the camera in the first orientation, the instructions, when executed by the processor, further cause the processor to control the system to perform: determining, based on the detected position of the local subject, that the local subject is not positioned at a center of the first local FOV; and adjusting the first orientation to offset a distance between the center of the first local FOV and the detected position of the local subject with respect to the first local FOV.

Item 9. The Item of claim 7, wherein for causing the camera orienting unit to orient the camera in the first orientation, the instructions, when executed by the processor, further cause the processor to control the system to perform: determining, based on the detected head-facing direction or eye-gazing direction of the local subject, that the local subject is not gazing at a center of the first local FOV; and adjusting the first orientation to offset an angular difference between the center of the first local FOV and the detected head-facing direction or eye-gazing direction of the local subject.

Item 10. A non-transitory computer-readable medium storing executable instructions that, when executed by a processor, cause the processor to control a system to perform: receiving, from a remote system via a communication network, a first remote field of view (FOV) of a remote subject; orienting, based on the received first remote FOV, a camera in a first orientation, the camera positioned on a rear surface of a display, wherein the camera oriented in the first orientation has a first local FOV corresponding to the first remote FOV received from the remote system; upon orienting the camera in the first orientation, causing the camera to capture a local image through the display; and transmitting, to the remote system via the communication network, the captured first local image.

Item 11. A method of operating a system for capturing a local image for transmission to a remote system, the system comprising (i) a display having a front surface facing a local subject and a rear surface facing opposite to the front surface, and (ii) a camera positioned on the rear surface of the display and configured to capture a local image through the display, the method comprising: receiving, from a remote system via a communication network, a first remote field of view (FOV) of a remote subject; orienting, based on the received first remote FOV, the camera in a first orientation, wherein the camera oriented in the first orientation has a first local FOV corresponding to the first remote FOV received from the remote system; upon orienting the camera in the first orientation, causing the camera to capture a first local image through the display; and transmitting, to the remote system via the communication network, the captured first local image.

Item 12. The method of Item 11, wherein orienting the camera in the first orientation comprises rotating the camera or controlling zooming of the camera.

Item 13. The method of Item 12, wherein orienting the camera in the first orientation further comprises moving the camera on the rear surface of the display.

Item 14. The method of Item 13, wherein orienting the camera in the first orientation further comprises at least one of: moving the camera on a plane substantially parallel to the rear surface of the display; and moving the camera in a three-dimensional (3D) space on the rear surface of the display.

Item 15. The method of Item 13, further comprising processing the captured first local image to emulate at least one of rotating, moving and zooming of the camera.

Item 16. The method of Item 11, further comprising: after receiving the first remote FOV, receiving, from the remote system via the communication network, a second remote FOV of the remote subject that is different from the first remote FOV; in response to receiving the second remote FOV of the remote subject, carrying out one of: performing (i) orienting the camera in a second orientation, wherein the camera oriented in the second orientation has a second local FOV corresponding to the second remote FOV received from the remote system, and (ii) upon orienting the camera in the second orientation, causing the camera to capture a second local image through the display; performing (i) capturing a third local image through the display, and (ii) processing, based on the received second remote FOV, the captured third local image to emulate at least one of rotating, moving and zooming of the camera; and performing (i) orienting, based on the received second remote FOV, the camera in a third orientation, (ii) upon orienting the camera in the third orientation, causing the image capturing unit to capture a fourth local image through the display, and (iii) processing, based on the received second remote FOV, the captured fourth local image to emulate at least one of rotating, moving and zooming of the camera; and transmitting, to the remote system via the communication network, the captured second local image, the processed third local image or the processed fourth local image.

Item 17. The method of Item 11, further comprising: detecting a position of the local subject with respect to the first local FOV; detecting a head-facing direction of the local subject with respect to the first local FOV; and detecting an eye-gazing direction of the local subject with respect to the first local FOV.

Item 18. The method of Item 17, wherein orienting the camera in the first orientation comprises: determining, based on the detected position of the local subject, that the local subject is not positioned at a center of the first local FOV; and adjusting the first orientation to offset a distance between the center of the first local FOV and the detected position of the local subject with respect to the first local FOV.

Item 19. The method of Item 17, wherein orienting the camera in the first orientation further comprises: determining, based on the detected head-facing direction or eye-gazing direction of the local subject, that the local subject is not gazing at a center of the first local FOV; and adjusting the first orientation to offset adjusting the first orientation to offset an angular difference between the center of the first local FOV and the detected head-facing direction or eye-gazing direction of the local subject.

Item 20. A system for capturing a local image for transmission to a remote system, comprising: a processor; and a computer-readable medium in communication with the processor, the computer-readable medium comprising executable instructions that, when executed by the processor, cause the processor to control the system to perform functions of: receiving, from a remote system via a communication network, a remote field of view (FOV) of a remote subject; orienting, based on the received remote FOV, the camera in a first orientation, wherein the camera oriented in the first orientation has a local FOV corresponding to the remote FOV received from the remote system; detecting at least one of a position, head-facing direction and eye-gazing direction of the local subject with respect to the local FOV; determining, based on at least one of the detected position, head-facing direction and eye-gazing direction of the local subject with respect to the local FOV, that the local subject is not positioned at a center of the local FOV or the local subject is not gazing at the center of the local FOV; orienting the camera in a second orientation that offsets at least one of a distance between the center of the first local FOV and the detected position of the local subject and an angular difference between the center of the first local FOV and the detected head-facing direction or eye-gazing direction of the local subject; causing the camera to capture a local image with the second orientation; and transmitting, to the remote system via the communication network, the captured first local image.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A system for capturing a local image for transmission to a remote system, comprising:
    a display having a front surface facing a local subject and a rear surface facing opposite to the front surface;
    an image capturing unit comprising (i) a single camera positioned on the rear surface of the display and configured to capture a local image through the display, and (ii) a camera orienting unit configured to physically move the camera;
    a processor; and
    a computer-readable medium in communication with the processor, the computer-readable medium comprising executable instructions that, when executed by the processor, cause the processor to control the system to perform functions of:
        receiving, from a remote system via a communication network, a first remote field of view (FOV) of a remote subject;
        causing, based on the received first remote FOV, the camera orienting unit to orient the camera in a first orientation, wherein the camera oriented in the first orientation has a first local FOV corresponding to the first remote FOV received from the remote system;
        upon orienting the camera in the first orientation, causing the image capturing unit to capture a first local image through the display; and
        transmitting, to the remote system via the communication network, the captured first local image.

2. The system of claim 1, wherein, for causing the camera orienting unit to orient the camera in the first orientation, the instructions, when executed by the processor, further cause the processor to control the system to perform causing the camera orienting unit to rotate the camera.

3. The system of claim 2, wherein, for causing the camera orienting unit to orient the camera in the first orientation, the instructions, when executed by the processor, further cause the processor to control the system to perform causing the camera orienting unit to move the camera on the rear surface of the display.

4. The system of claim 3, wherein, for causing the camera orienting unit to orient the camera in the first orientation, the instructions, when executed by the processor, further cause the processor to control the system to perform at least one of:
    causing the camera orienting unit to move the camera on a plane substantially parallel to the rear surface of the display; and
    causing the camera orienting unit to move the camera in a three-dimensional (3D) space on the rear surface of the display.

5. The system of claim 1, where the instructions, when executed by the processor, further cause the processor to control the system to perform:
    after receiving the first remote FOV, receiving, from the remote system via the communication network, the second remote FOV of the remote subject that is different from the first remote FOV;
    in response to receiving the second remote FOV of the remote subject, carrying out one of:
        performing (i) causing, based on the received second remote FOV, the camera orienting unit to orient the camera in a second orientation, wherein the camera oriented in the second orientation has a second local FOV corresponding to the second remote FOV received from the remote system, and (ii) upon orienting the camera in the second orientation, causing the image capturing unit to capture a second local image through the display;
        performing (i) causing the image capturing unit to capture a third local image through the display, and (ii) processing, based on the received second remote FOV, the captured third local image to emulate at least one of rotating, moving and zooming of the camera; and
        performing (i) causing, based on the received second remote FOV, the camera orienting unit to orient the camera in a third orientation, (ii) upon orienting the camera in the third orientation, causing the image capturing unit to capture a fourth local image through the display, and (iii) processing, based on the received second remote FOV, the captured fourth local image to emulate at least one of rotating, moving and zooming of the camera; and
    transmitting, to the remote system via the communication network, the captured second local image, the processed third local image or the processed fourth local image.

6. The system of claim 1, wherein, the instructions, when executed by the processor, further cause the processor to control the system to perform at least one of:
    detecting a position of the local subject with respect to the first local FOV;
    detecting a head-facing direction of the local subject with respect to the first local FOV; and
    detecting an eye-gazing direction of the local subject with respect to the first local FOV.

7. The system of claim 6, wherein, for causing the camera orienting unit to orient the camera in the first orientation, the instructions, when executed by the processor, further cause the processor to control the system to perform:
    determining, based on the detected position of the local subject, that the local subject is not positioned at a center of the first local FOV; and
    adjusting the first orientation to offset a distance between the center of the first local FOV and the detected position of the local subject with respect to the first local FOV.

8. The system of claim 6, wherein for causing the camera orienting unit to orient the camera in the first orientation, the instructions, when executed by the processor, further cause the processor to control the system to perform:

determining, based on the detected head-facing direction or eye-gazing direction of the local subject, that the local subject is not gazing at a center of the first local FOV; and adjusting the first orientation to offset an angular difference between the center of the first local FOV and the detected head-facing direction or eye-gazing direction of the local subject.

9. A non-transitory computer-readable medium storing executable instructions that, when executed by a processor, cause the processor to control a system to perform:

receiving, from a remote system via a communication network, a first remote field of view (FOV) of a remote subject;

orienting, based on the received first remote FOV, a single camera in a first orientation, the camera positioned on a rear surface of a display, wherein the camera oriented in the first orientation has a first local FOV corresponding to the first remote FOV received from the remote system and the single camera is oriented in the first orientation by physically moving the single camera;

upon orienting the camera in the first orientation, causing the camera to capture a local image through the display; and transmitting, to the remote system via the communication network, the captured first local image.

10. A method of operating a system for capturing a local image for transmission to a remote system, the system comprising (i) a display having a front surface facing a local subject and a rear surface facing opposite to the front surface, and (ii) a single camera positioned on the rear surface of the display and configured to capture a local image through the display, the method comprising:

receiving, from a remote system via a communication network, a first remote field of view (FOV) of a remote subject;

orienting, based on the received first remote FOV, the single camera in a first orientation by physically moving the camera, wherein the camera oriented in the first orientation has a first local FOV corresponding to the first remote FOV received from the remote system;

upon orienting the camera in the first orientation, causing the camera to capture a first local image through the display; and transmitting, to the remote system via the communication network, the captured first local image.

11. The method of claim 10, wherein orienting the camera in the first orientation comprises rotating the camera.

12. The method of claim 11, wherein orienting the camera in the first orientation further comprises moving the camera on the rear surface of the display.

13. The method of claim 12, wherein orienting the camera in the first orientation further comprises at least one of:

moving the camera on a plane substantially parallel to the rear surface of the display; and moving the camera in a three-dimensional (3D) space on the rear surface of the display.

14. The method of claim 10, further comprising:

after receiving the first remote FOV, receiving, from the remote system via the communication network, a second remote FOV of the remote subject that is different from the first remote FOV;

in response to receiving the second remote FOV of the remote subject, carrying out one of:

performing (i) orienting the camera in a second orientation, wherein the camera oriented in the second orientation has a second local FOV corresponding to the second remote FOV received from the remote system, and (ii) upon orienting the camera in the second orientation, causing the camera to capture a second local image through the display;

performing (i) capturing a third local image through the display, and (ii) processing, based on the received second remote FOV, the captured third local image to emulate at least one of rotating, moving and zooming of the camera; and performing (i) orienting, based on the received second remote FOV, the camera in a third orientation, (ii) upon orienting the camera in the third orientation, causing the image capturing unit to capture a fourth local image through the display, and (iii) processing, based on the received second remote FOV, the captured fourth local image to emulate at least one of rotating, moving and zooming of the camera; and transmitting, to the remote system via the communication network, the captured second local image, the processed third local image or the processed fourth local image.

15. The method of claim 10, further comprising:

detecting a position of the local subject with respect to the first local FOV;

detecting a head-facing direction of the local subject with respect to the first local FOV; and detecting an eye-gazing direction of the local subject with respect to the first local FOV.

16. The method of claim 15, wherein orienting the camera in the first orientation comprises:

determining, based on the detected position of the local subject, that the local subject is not positioned at a center of the first local FOV; and adjusting the first orientation to offset a distance between the center of the first local FOV and the detected position of the local subject with respect to the first local FOV.

17. The method of claim 15, wherein orienting the camera in the first orientation further comprises:

determining, based on the detected head-facing direction or eye-gazing direction of the local subject, that the local subject is not gazing at a center of the first local FOV; and adjusting the first orientation to offset adjusting the first orientation to offset an angular difference between the center of the first local FOV and the detected head-facing direction or eye-gazing direction of the local subject.

18. A system for capturing a local image for transmission to a remote system, comprising:

a processor; and a non-transitory computer-readable medium in communication with the processor, the computer-readable medium comprising executable instructions that, when executed by the processor, cause the processor to control the system to perform functions of:

receiving, from a remote system via a communication network, a remote field of view (FOV) of a remote subject;

orienting, based on the received remote FOV, a single camera in a first orientation by physically moving the single camera, wherein the camera oriented in the first orientation has a local FOV corresponding to the remote FOV received from the remote system;

detecting at least one of a position, head-facing direction and eye-gazing direction of the local subject with respect to the local FOV;

determining, based on at least one of the detected position, head-facing direction and eye-gazing direction of the local subject with respect to the local FOV, that the local subject is not positioned at a center of the local FOV or the local subject is not gazing at the center of the local FOV;

orienting the camera in a second orientation that offsets at least one of a distance between the center of the first local FOV and the detected position of the local subject and an angular difference between the center of the first local FOV and the detected head-facing direction or eye-gazing direction of the local subject;

causing the camera to capture a local image with the second orientation; and transmitting, to the remote system via the communication network, the captured first local image.

\* \* \* \* \*